United States Patent
Noda et al.

(10) Patent No.: US 11,442,340 B2
(45) Date of Patent: Sep. 13, 2022

(54) ELECTRONIC APPARATUS, ELECTRONIC APPARATUS CONTROL METHOD AND STORAGE MEDIUM

(71) Applicant: CANON KABUSHIKI KAISHA, Tokyo (JP)

(72) Inventors: Atsuto Noda, Tokyo (JP); Shinga Nakashima, Yokohama (JP); Akira Watanabe, Tokyo (JP); Takazumi Seo, Tokyo (JP); Kohei Uemura, Kawasaki (JP); Toshihiro Ogawa, Tokyo (JP); Hiroshi Toriumi, Yokohama (JP)

(73) Assignee: CANON KABUSHIKI KAISHA, Tokyo (JP)

( * ) Notice: Subject to any disclaimer, the term of this patent is extended or adjusted under 35 U.S.C. 154(b) by 0 days.

(21) Appl. No.: 17/061,428

(22) Filed: Oct. 1, 2020

(65) Prior Publication Data
US 2021/0018820 A1    Jan. 21, 2021

Related U.S. Application Data
(63) Continuation of application No. PCT/JP2019/013159, filed on Mar. 27, 2019.

(30) Foreign Application Priority Data
Apr. 3, 2018 (JP) ............... JP2018-071237
Feb. 21, 2019 (JP) ............... JP2019-029318

(51) Int. Cl.
*G03B 17/12* (2021.01)
*H04N 5/225* (2006.01)
(Continued)

(52) U.S. Cl.
CPC ............ *G03B 17/12* (2013.01); *B06B 1/0246* (2013.01); *G06F 3/016* (2013.01); *H04N 5/2253* (2013.01); *B06B 1/0215* (2013.01)

(58) Field of Classification Search
CPC ........................................ G06F 3/016
See application file for complete search history.

(56) References Cited

U.S. PATENT DOCUMENTS 7,088,256 B2 *    8/2006    Opela ............... H02J 7/00712
                                              340/636.15
8,084,968 B2 *   12/2011    Murray ................ G08B 6/00
                                              318/114
(Continued)

FOREIGN PATENT DOCUMENTS

JP    2007034439 A    2/2007
JP    2011008970 A    1/2011
(Continued)

OTHER PUBLICATIONS

PCT/IB/326 (PCT Notification Concerning Transmittal of International Preliminary Report on Patentability).
(Continued)

*Primary Examiner* — Leon W Rhodes, Jr.
(74) *Attorney, Agent, or Firm* — Cowan, Liebowitz & Latman, P.C.

(57) ABSTRACT

An electronic apparatus to which an external apparatus is detachably attachable includes a controlling unit configured to make a vibration device vibrate by using a vibration parameter corresponding to a type of the external apparatus to be attached to the electronic apparatus, the vibration device being provided on at least one of the electronic apparatus and the external apparatus.

17 Claims, 17 Drawing Sheets

(51) Int. Cl.
*B06B 1/02* (2006.01)
*G06F 3/01* (2006.01)

(56) References Cited

U.S. PATENT DOCUMENTS

| | | | |
|---|---|---|---|
| 9,802,225 B2* | 10/2017 | Houston | B06B 1/16 |
| 10,117,036 B2* | 10/2018 | Wen | H04R 29/001 |
| 10,981,053 B2* | 4/2021 | Nakagawa | A63F 13/424 |
| 2013/0141524 A1* | 6/2013 | Karunamuni | H04N 5/232945 |
| | | | 348/38 |
| 2014/0104453 A1* | 4/2014 | Fujinawa | H04N 5/23219 |
| | | | 348/222.1 |

FOREIGN PATENT DOCUMENTS

| | | |
|---|---|---|
| JP | 5172706 B2 | 3/2013 |
| JP | 2014021403 A | 2/2014 |
| JP | 2014164172 A | 9/2014 |
| JP | 2014164754 A | 9/2014 |
| JP | 2016157037 A | 9/2016 |
| JP | 2017073823 A | 4/2017 |
| KR | 20120110669 A * | 10/2012 |
| WO | 2007/092171 A1 | 8/2007 |

OTHER PUBLICATIONS

PCT/IB/373 (PCT International Preliminary Report on Patentability).
PCT/ISA/237 (PCT Written Opinion of the International Searching Authority).
PCT/IB/338 (PCT Notification of Transmittal of Translation of the International Preliminary Report on Patentability).
The above foreign patent documents 1, and 3-9 were cited in the International Search Report of PCT/JP2019/013159 dated Oct. 10, 2069.

* cited by examiner

| | ACCESSORY 201 | VIBRATION FREQUENCY 202 | VIBRATION STRENGTH (AMPLITUDE) 203 | VIBRATION DURATION 204 | VIBRATION DEVICE BUILT-IN INFORMATION 205 | ATTACHMENT LOCATION 206 |
|---|---|---|---|---|---|---|
| A | STROBE 1 | 200 | 4 | 2 | ○ | HOT SHOE |
| B | STROBE 2 | 210 | 3 | 1 | × | HOT SHOE |
| C | MICROPHONE 1 | 240 | 2 | 1 | × | HOT SHOE |
| D | LENS 1 | 220 | 2 | 2 | ○ | LENS MOUNT |
| E | STROBE 1 LENS 2 | 190 | 5 | 3 | ○ | HOT SHOE LENS MOUNT |
| F | LENS ADAPTOR LENS 3 | 205 | 4 | 3 | × | LENS MOUNT |
| . | . | . | . | . | . | . |
| . | . | . | . | . | . | . |
| . | . | . | . | . | . | . |

FIG. 8

| 200 | 201 | 202 | 203 | 204 | 205 | 206 | 207 |
|---|---|---|---|---|---|---|---|
| | ACCESSORY | VIBRATION FREQUENCY | VIBRATION STRENGTH (AMPLITUDE) | VIBRATION DURATION | VIBRATION DEVICE BUILT-IN INFORMATION | ATTACHMENT LOCATION | PHASE DIFFERENCE OF VIBRATION |
| A | STROBE 1 | 200 | 4 | 2 | ○ | HOT SHOE | 180°(DEFAULT) 135°(AFTER CALIBRATION) |
| B | STROBE 2 | 210 | 3 | 1 | × | HOT SHOE | 135° |
| C | MICROPH-ONE 1 | 240 | 2 | 1 | × | HOT SHOE | 180° |
| D | LENS 1 | 220 | 2 | 2 | ○ | LENS MOUNT | 90° |
| E | STROBE 1 LENS 2 | 190 | 5 | 3 | ○ | HOT SHOE LENS MOUNT | 135° |
| F | LENS ADAPTOR LENS 3 | 205 | 4 | 3 | × | LENS MOUNT | 135° |
| · | · | · | · | · | · | · | · |
| · | · | · | · | · | · | · | · |
| · | · | · | · | · | · | · | · |

FIG. 17

ELECTRONIC APPARATUS, ELECTRONIC APPARATUS CONTROL METHOD AND STORAGE MEDIUM

CROSS-REFERENCE TO RELATED APPLICATIONS

This application is a Continuation of International Patent Application No. PCT/JP2019/013159, filed on Mar. 27, 2019, which claims the benefit of Japanese Patent Application No. 2018-071237, filed on Apr. 3, 2018, and the benefit of Japanese Patent Application No. 2019-029318, filed on Feb. 21, 2019, each of which is hereby incorporated by reference herein in their entirety.

BACKGROUND OF THE INVENTION

Field of the Invention

The present invention relates to an electronic apparatus, a control method of the electronic apparatus and a storage medium.

Description of the Related Art

Conventionally, some optical apparatuses such as digital cameras and video cameras are known to have a configuration including an operation member in which a user operation unit rotates in order to adjust settings relating to an image pickup condition such as a focus, diaphragm, and zoom. A mechanical mechanism is proposed in which a click feeling is generated according to a rotation amount of an operation member so that a user can easily recognize an operating amount, moving amount, adjusting amount, and adjusting position. Japanese Patent Laid-Open No. 2011-008970 discloses an electronic apparatus including a rotatable operation member, a rotation member that has a plurality of holes formed in a circumferential direction and that integrally rotates with the operation member, and a click mechanism that generates a click feeling by engaging with the hole of the rotation member according to a rotating operation of the operation member. However, when the click feeling is generated by the mechanical mechanism, a click sound occurs. For example, when the operation member is rotated to change the image pickup condition while a motion image is captured by a digital camera or a video camera, the click sound may be recorded in the motion image. In a place where surroundings are quiet and quietness is required, the click sound may become a noise to the surroundings, and thus it is necessary to take measures such as changing a user interface so as to reduce the number of clicks.

In an electronic apparatus such as a mobile terminal, for example, in order to notify a user of a detection of an input operation to a touch panel, a control is widely performed that electrically drives a vibration device according to a detection result of the input operation and that feeds back a vibration to the user. In recent years, technological advances in vibration devices and control circuits have made it possible not only to generate a conventional monotonous vibration but also to control the vibration more precisely. By using such a so-called haptics technology, it is possible to reproduce complex and various tactile sensations such as reproduction of a high-quality click feeling.

In the above-described optical apparatus, it is possible to electrically perform a proper control, for example, turning on/off or changing a strength of the click feeling according to an image pickup mode or an image pickup environment, by installing a vibration device instead of the conventional mechanical mechanism and using a haptics technology. Further, it is possible to perform a control with a relatively high degree of freedom by changing a vibration control on, for example, a vibration amplitude and frequency of the vibration device in order to change a type of the tactile sensation according to a user's taste or to generate the click feeling according to a function. The tactile sensation reproduced by the vibration device can be changed by adjusting various vibration parameters such as a driving frequency and an amplitude controlled by a control circuit. Japanese Patent No. 05172706 discloses a configuration in which a vibration parameter is changed and adjusted according to the type of the electronic apparatus in which the vibration device is installed.

An optical apparatus such as a digital camera may be used while being attached to various types of accessories such as a strobe and external microphone, and lenses of various sizes and weights. The optical apparatus may be used while being fixed to a waterproof case, a tripod or the like. That is, when the vibration device vibrates based on the vibration parameter adjusted by the optical apparatus itself, a tactile sensation effect felt by the user may be different depending on presence or absence and the type of the accessory attachable to the optical apparatus.

The present invention provides an electronic apparatus, a control method of the electronic apparatus, and a storage medium each of which can reduce a difference in user's feeling of a tactile sensation effect generated by a vibration device even if there is a difference in a presence or absence or type of an accessory to be attached.

SUMMARY OF THE INVENTION

An electronic apparatus to which an external apparatus is detachably attachable as one aspect of the present invention includes a controlling unit configured to make a vibration device vibrate by using a vibration parameter corresponding to a type of the external apparatus to be attached to the electronic apparatus, the vibration device being provided on at least one of the electronic apparatus and the external apparatus.

An electronic apparatus as another aspect of the present invention includes a first electronic apparatus and a second electronic apparatus to which the first electronic apparatus is detachably attachable. At least one of the first electronic apparatus and the second electronic apparatus includes a vibration device that generates a vibration. The first electronic apparatus includes a controlling unit that makes the vibration device vibrate by using a vibration parameter corresponding to a type of the second electronic apparatus.

A control method of an electronic apparatus to which an external apparatus is detachably attachable as one aspect of the present invention includes steps of attaching the external apparatus to the electronic apparatus, and making a vibration device vibrate by using a vibration parameter corresponding to a type of the external apparatus to be attached to the electronic apparatus, the vibration device being provided on at least one of the electronic apparatus and the external apparatus.

A non-transitory computer-readable storage medium storing a computer program that causes a computer to execute the above control method constitute one aspect of the present invention.

A control method of an electronic apparatus to which an external apparatus is detachably attachable also constitutes another aspect of the present invention. The electronic apparatus includes a plurality of vibration devices, an image pickup unit configured to capture an object image and a vibration detecting unit disposed near the image pickup unit. The control method comprising a step of calibrating a vibration parameter for the plurality of vibration devices in order that a vibration amount of the vibration detecting unit is equal to or less than a predetermined threshold.

Further features of the present invention will become apparent from the following description of exemplary embodiments with reference to the attached drawings.

BRIEF DESCRIPTION OF THE DRAWINGS

FIG. 8 is a diagram illustrating a management table of vibration parameters according to the first embodiment.

FIG. 17 is a diagram illustrating a management table of vibration parameters according to the fourth embodiment.

DESCRIPTION OF THE EMBODIMENTS

Figure 1:
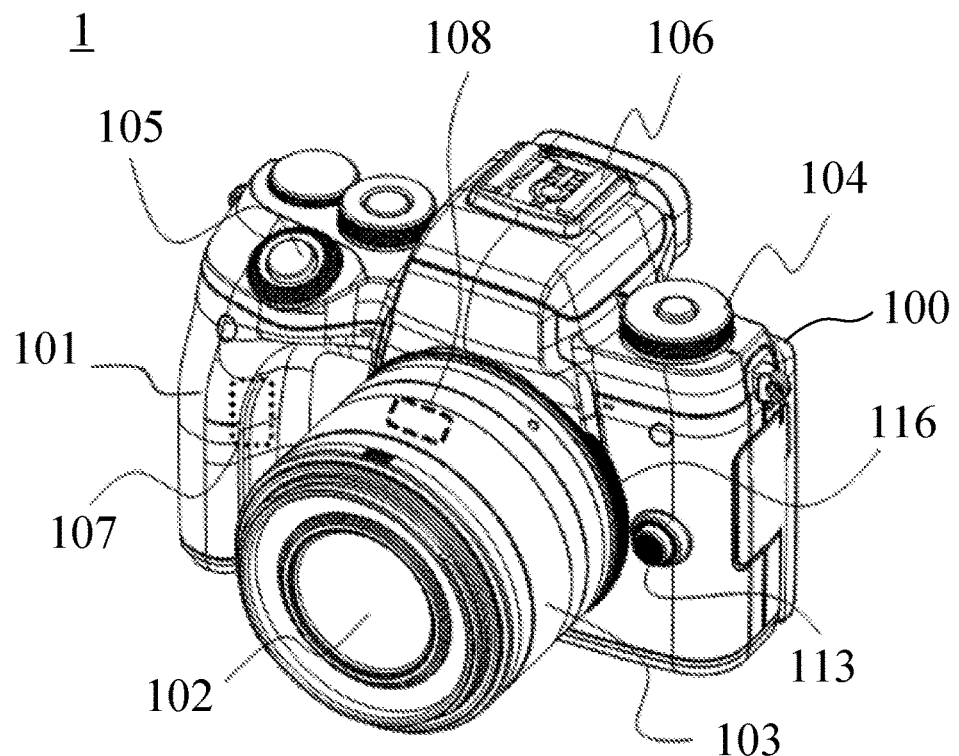
FIG. 1 is an external perspective view of a digital camera as an example of an electronic apparatus according to each embodiment of the present invention.

Hereinafter, a detailed description will be given of the embodiments of the present invention with reference to the drawings. Corresponding elements in respective figures will be designated by the same reference numerals, and a description thereof will be omitted.

A description will be given of an optical apparatus having an optical element, which is an example of an electronic apparatus according to the embodiments of the present invention, with reference to FIG. 1. FIG. 1 is an external perspective view of a digital camera 1 which is an example of an electronic apparatus according to the embodiments of the present invention. In each embodiment, a case will be described where the present invention is applied to an optical apparatus, but the present invention is not limited to this. The present invention is applicable to, for example, all of electronic apparatuses in each of which a detachably attachable accessory is attached to a main body and a vibration device is mounted on at least one of the main body and the accessory.

The digital camera 1 includes a digital camera main body (hereinafter referred to as a camera main body) 100 and a lens barrel 102 which is an imaging unit configured to form an image of an object light beam as an optical image.

On a front part of the camera main body 100, a grip portion 101 for a user to hold is provided. The lens barrel 102 is detachably attached to the camera main body 100 via a lens mount 116 provided on the camera main body 100. In FIG. 1, the lens barrel 102 is locked and fixed by a lock mechanism (not illustrated). In this state, when a lens lock release button 113 is pressed, the lock mechanism becomes a lock released state, and the lens barrel 102 becomes rotatable around an optical axis of the lens barrel 102. When the lens barrel 102 rotates by a predetermined angle in the lock released state, the lens barrel 102 can be detached from the camera main body 100. A rotatable operation portion 103 configured to be operated by the user is provided on an outer periphery of the lens barrel 102. The rotatable operation portion 103 is rotatable around the optical axis of the lens barrel 102. The user can assign an arbitrary function for varying an image pickup condition to the rotatable operation portion 103. For example, by rotating the rotatable operation portion 103, it is possible to vary the image pickup condition such as a focal position and an exposure correction value.

The top surface portion of the camera main body 100 provides a mode dial 104 for switching various image pickup modes, a release button 105 that is pressed to start image pickup, and an accessory shoe 106 to which an external device such as external flash or external microphone is detachably attachable. By rotating the mode dial 104, it is possible to switch various image pickup modes, for example, a manual image pickup mode in which the user can arbitrarily set the image pickup conditions such as a shutter speed and an aperture value (F-number), an automatic image pickup mode that automatically acquires a suitable exposure amount, and a motion image pickup mode.

A vibration device 107 is provided inside the grip portion 101. A vibration device 108 is provided inside the lens barrel 102. The vibration devices 107 and 108 use, for example, a piezoelectric element or an eccentric motor and a linear actuator, and their amplitude and frequency are variable. The vibration devices 107 and 108 are configured to give a vibration to the grip portion 101 and the rotatable operation portion 103 by generating the vibration in response to operation of an operator such as the rotatable operation portion 103, the mode dial 104 and the release button 105. When the vibration device 108 is not provided inside the lens barrel 102, only the vibration device 107 may generate the vibration in response to the operation of the operator.

Figure 2:
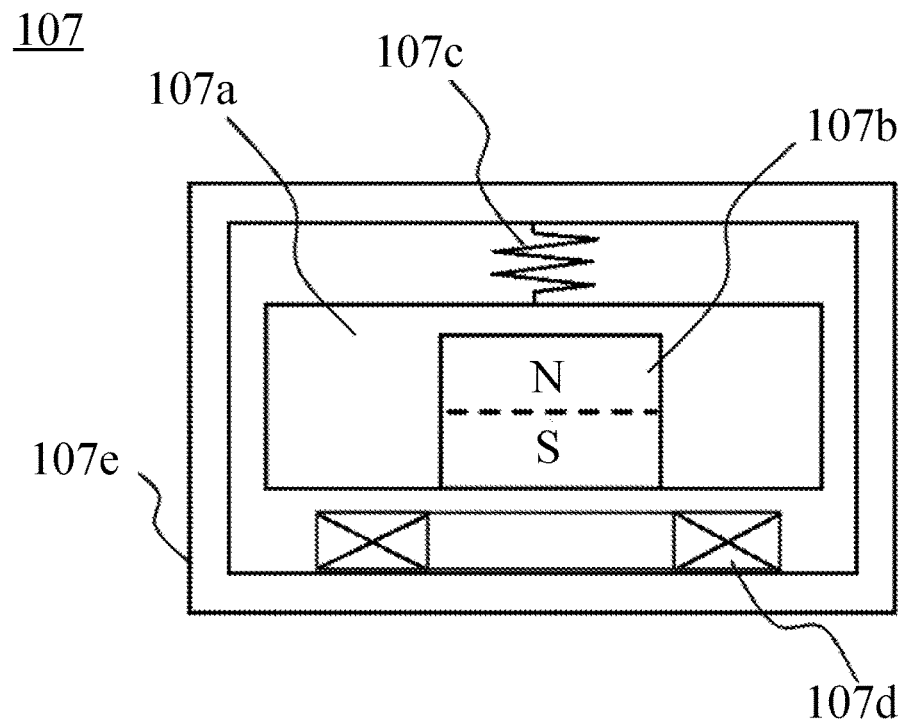
FIG. 2 is a diagram illustrating an internal configuration of a vibration device.

FIG. 2 is a diagram illustrating an internal configuration of the vibration device 107. In each embodiment, an LRA (Linear Resonant Actuator) type vibration device is used as an example of the vibration device 107. The vibration device 107 includes a vibrator 107a, a magnet 107b, a spring 107c, a coil 107d and a base 107e. The vibrator 107a holds the magnet 107b and is connected to the base 107e via the spring 107c. The base 107e holds the vibrator 107a movably in a load direction of the spring 107c. The coil 107d is disposed in the vicinity of the magnet 107b and is electrically connected to a circuit board (not illustrated). The coil 107d generates an electromagnetic force by receiving a current from the circuit board. The vibrator 107a is caused to move back and forth and the vibration device 107 is caused to generate the vibration, by the electromagnetic force and an attracting or repulsing force of a magnetic force of the magnet 107b.

Figure 3:
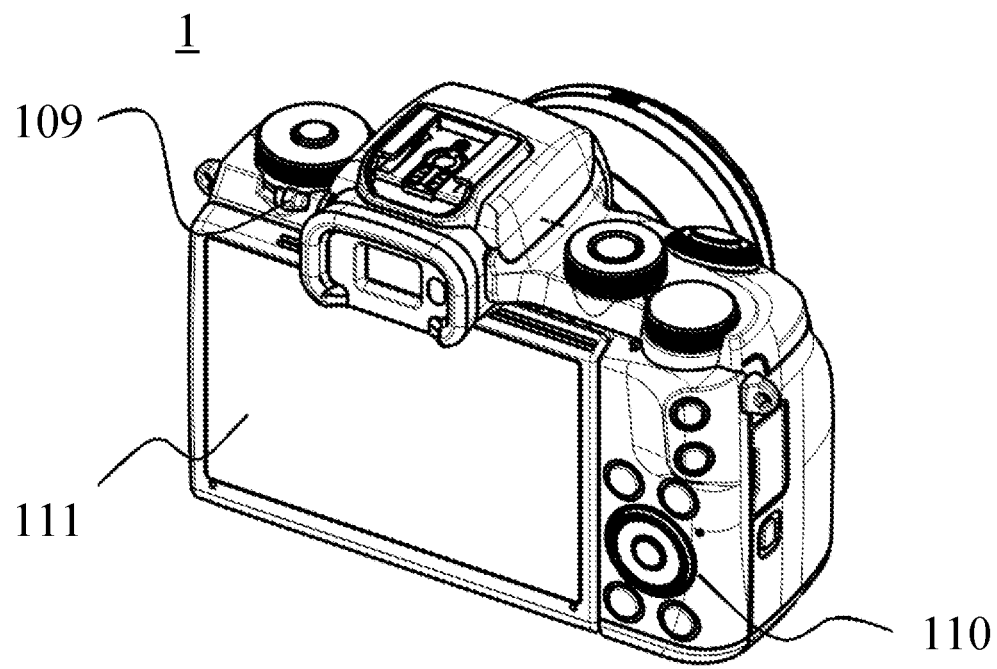
FIG. 3 is a rear perspective view of the digital camera.

FIG. 3 is a rear perspective view of the camera main body 100. On the top surface portion of the camera main body 100, a power lever 109 is disposed for switching operation/non-operation states of the camera main body 100. When the user operates the power lever 109 while the camera main body 100 is in the non-operation state, the camera main body 100 becomes the operation state that can capture an image. When the user operates the power lever 109 while the camera main body 100 is in the operation state, the camera main body 100 becomes the non-operation state such as a low power consumption state.

The rear surface portion of the camera main body 100 is provided with an operation button 110 to which various functions are assigned and a display unit 111 having a display configured to display an image. The operation button 110 includes a reproduction button configured to instruct a reproduction of image data, and the pickup image is displayed on the display unit 111 by operating the reproduction button. When the camera main body 100 is in the operation state, the display unit 111 displays a real-time image of an object image under an image pickup. The display unit 111 displays various image pickup parameters such as a shutter speed and F-number, and the user can change set values of the image pickup parameters by operating the operation button 110.

Figure 4:
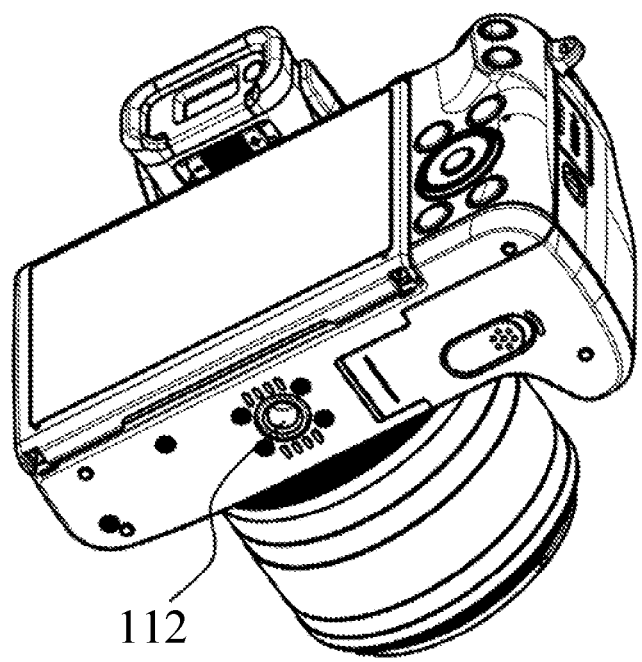
FIG. 4 is a bottom view of the digital camera.

FIG. 4 is a bottom view of the camera main body 100. A bottom surface portion of the camera main body 100 is provided with a tripod seat 112 to which various external apparatuses such as a tripod and a jacket are attachable.

Figure 5:
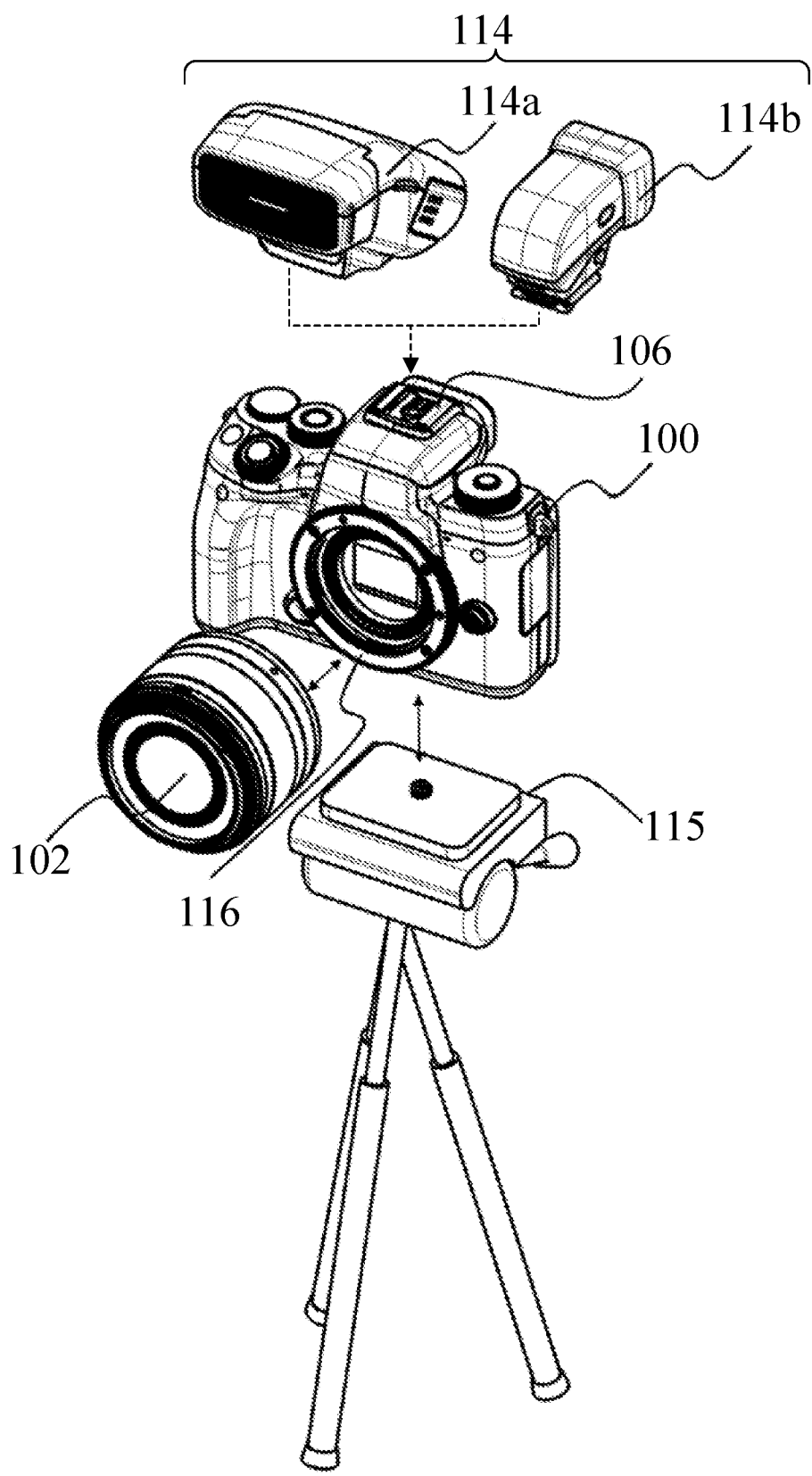
FIG. 5 is a diagram illustrating various attachments attachable to the digital camera main body.

FIG. 5 illustrates various attachments attachable to the camera main body 100. The camera main body 100 is attachable of an external apparatus such as a lens barrel 102, an external strobe 114a, an external EVF 114b and a tripod 115. The lens barrel 102 is attachable to the lens mount 116. The lens mount 116 has an electrical contact, and is electrically connected to the lens barrel 102 when the lens barrel 102 has an electrical contact. The accessory shoe 106 is attachable of various attachments 114 such as the external strobe 114a and the external EVF 114b. The accessory shoe 106 has an electrical contact, and is electrically connected to the various attachments 114 when the various attachments 114 attachable to the accessory shoe 106 have an electrical contact. The tripod 115 is attachable to the tripod seat 112. The tripod seat 112 has no electrical contact and is not electrically connected to the tripod seat 112.

Figure 6:
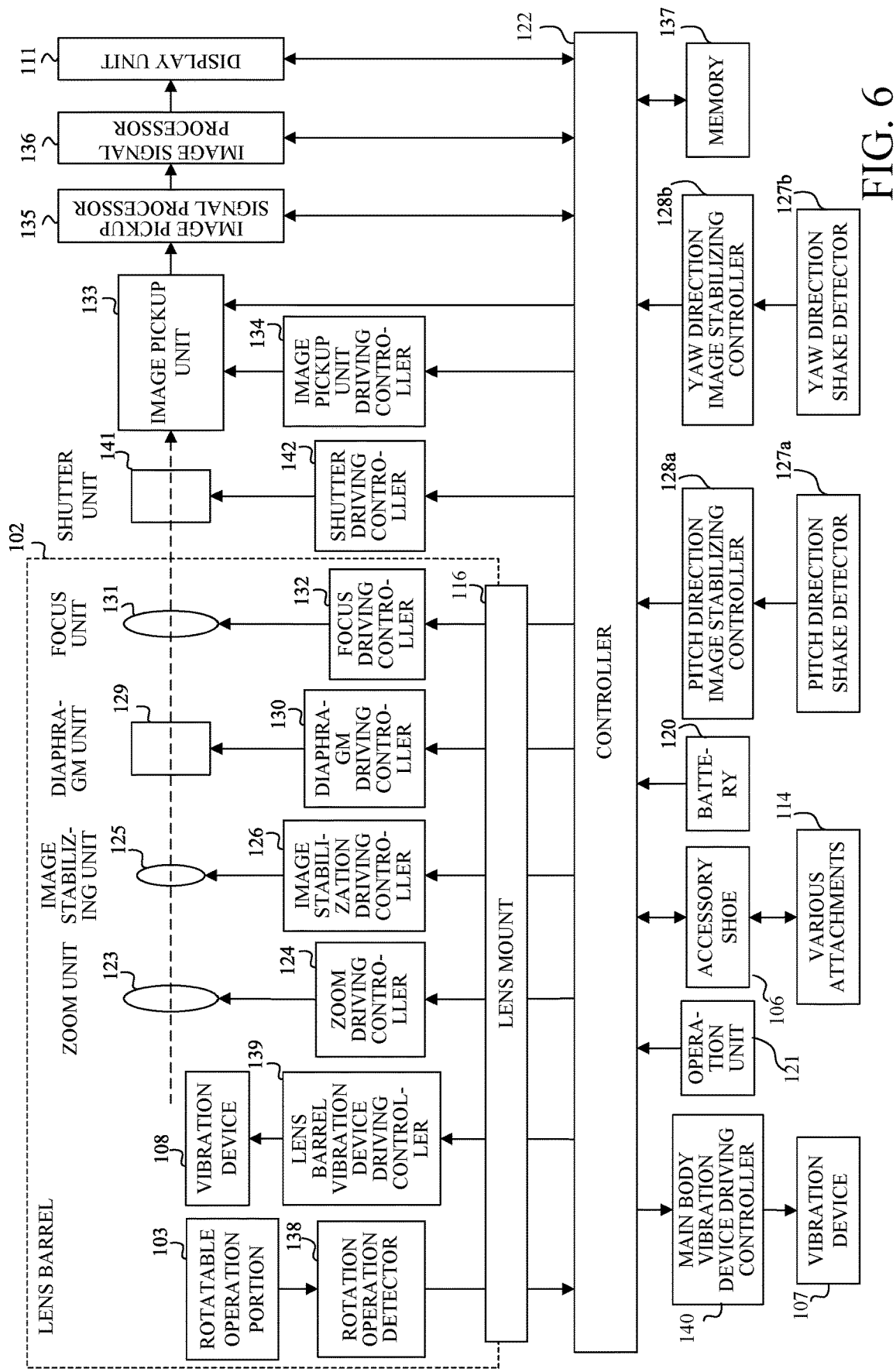
FIG. 6 is a block diagram of the digital camera.

FIG. 6 is a block diagram of a digital camera in this embodiment. A battery 120 is configured to supply power to each portion of the camera main body 100. The accessory shoe 106 is configured to input and output a communication signal and an image signal to and from various attachments (external apparatus) 114. An operation unit 121 is, for example, the mode dial 104, the release button 105 and the power lever 109, and is a member for the user to operate the camera main body 100. The controller 122 is configured to control each unit of the camera main body 100 by reading and executing a control program stored on a memory (not illustrated).

The lens barrel 102 includes a zoom unit 123 configured to move at least one optical lens along the optical axis in order to perform a magnification variation, and a zoom driving controller 124 configured to drive and control the zoom unit 123. When a magnification variation instruction is input via the rotatable operation portion 103, the zoom driving controller 124 drives the zoom unit 123 based on the instruction received from the controller 122.

The lens barrel 102 includes an image stabilizing unit 125 having a shift lens as a movable optical correcting unit, and an image stabilization driving controller 126 configured to drive and control the image stabilizing unit 125. The shift lens is movable in a direction different from the optical axis direction. When the image stabilization function is set to ON during the image pickup, the image stabilization driving controller 126 operates an image stabilization using the image stabilizing unit 125 based on the instruction received from the controller 122.

The image stabilization driving controller 126 includes a pitch direction shake detector 127a and a yaw direction shake detector 127b as shake detecting units each of which can detect a vibration applied to the camera main body 100. For example, an angular acceleration sensor is used as the pitch direction shake detector 127a and the yaw direction shake detector 127b. The pitch direction shake detector 127a is configured to detect a shake in the vertical direction (pitch direction) of the camera main body 100 in a normal orientation, that is, an orientation in which a length direction of an image frame substantially matches a horizontal direction. The yaw direction shake detector 127b is configured to detect a shake in the horizontal direction (yaw direction) of the camera main body 100 in the normal orientation.

The pitch direction image stabilizing controller 128a is configured to calculate a driving signal in the pitch direction based on a shake signal of the pitch direction shake detector 127a. The yaw direction image stabilizing controller 128b is configured to calculate a driving signal in the yaw direction based on the shake signal of the yaw direction shake detector 127b. A position of the image stabilizing unit 125 is detected by, for example, a magnet and a hall element (not illustrated). The pitch direction shake detector 127a and the yaw direction shake detector 127b may be disposed only on the lens barrel 102, or may be disposed on both the lens barrel 102 and the camera main body 100.

The lens barrel 102 includes a diaphragm unit 129 configured to operate a diaphragm, and a diaphragm driving controller 130 configured to drive and control the diaphragm unit 129. The lens barrel 102 includes a lens for adjusting focus, and has a focus unit 131 configured to adjust the focus and a focus driving controller 132 configured to drive and control the focus unit 131.

The camera main body 100 includes a shutter unit 141 configured to operate a shutter, and a shutter driving controller 142 configured to drive and control the shutter unit 141. The camera main body 100 includes an image pickup unit 133 having an image sensor configured to convert an optical image of an object into an electric signal by a photoelectric conversion. The image pickup unit 133 is configured to be drivable on a plane orthogonal to the optical axis. The image pickup unit 133 is configured to receive the driving signal based on the shake signal of the pitch direction shake detector 127a and the yaw direction shake detector 127b via the image pickup unit driving controller 134, and to operate a camera shake correction.

The release button 105 is a two-step switch, and is configured so that a first switch (SW1) and a second switch (SW2) are sequentially turned on according to a pressed amount. The first switch (SW1) is turned on when the release button 105 is pressed substantially halfway, and the second switch (SW2) is turned on when the release button 105 is fully pressed. When the first switch (SW1) is turned on, the focus driving controller 132 drives the focus unit 131 to adjust the focus. The diaphragm driving controller 130 is configured to drive the diaphragm unit 129 to perform an automatic exposure adjustment (AE), and the controller 122 is configured to perform an image pickup preparation such as an automatic white balance (AWB) and EF (flash pre-flash) processing. When the second switch (SW2) is turned on, an optical image formed by the lens barrel 102 is exposed on the image pickup unit 133, and the image pickup unit 133 photoelectrically converts the optical image and outputs it as an electric signal.

The image pickup signal processor 135 is configured to perform conversion processing for converting the electric signal output from the image pickup unit 133 into an image signal. The image signal processor 136 is configured to process the image signal output from the image pickup signal processor 135 according to a purpose. The memory 137 is configured to store image data generated by the image signal processor 136. The memory 137 is configured to store various functions and settings of the camera main body 100. The display unit 111 is configured to display the image data generated by the image signal processor 136 if necessary.

The lens barrel 102 includes a rotation operation detector 138 configured to detect a rotation of the rotatable operation portion 103. When the rotation operation detector 138 detects an operation on the rotatable operation portion 103, the controller 122 transmits a vibration control signal to the vibration device 108 via the lens barrel vibration device driving controller 139 in order to vibrate the vibration device 108. The vibration control signal may be transmitted to the vibration device 108 not only when the rotatable operation portion 103 is operated but also when the operation unit 121 is operated. The vibration device 107 may be vibrated when the rotatable operation portion 103 or the operation unit 121 is operated, and both the vibration devices 107 and 108 may be vibrated.

First Embodiment

Figure 7:
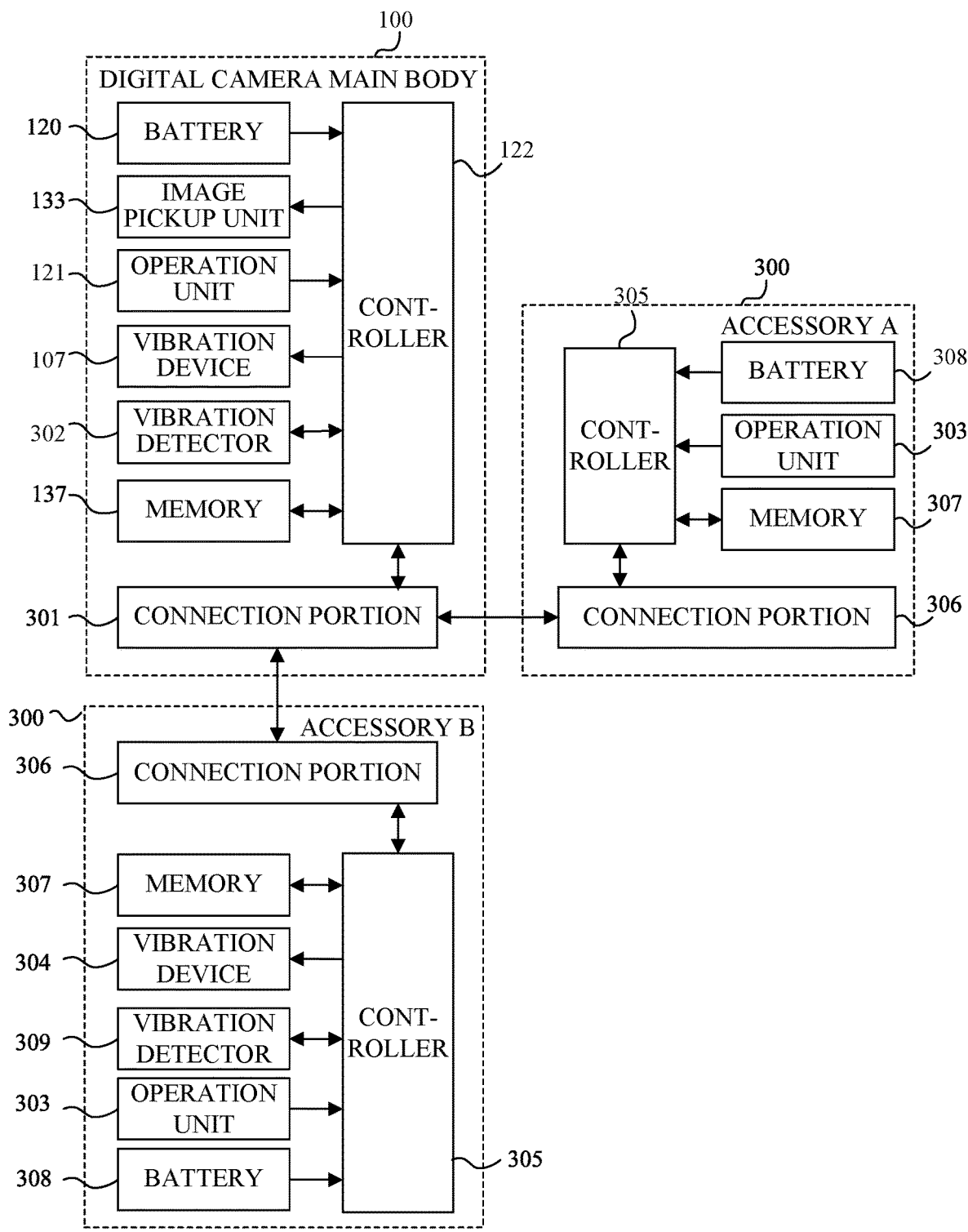
FIG. 7 is a block diagram illustrating a connection between a digital camera main body and an accessory according to a first embodiment.

FIG. 7 is a block diagram illustrating a connection between the camera main body 100 and an accessory 300 such as an accessory A and an accessory B. The camera main body 100 and the accessory 300 are electrically connected to each other via a connection portion 301 such as the accessory shoe 106 and the lens mount 116 and the connection portion 306 provided on the accessory 300, and are communicable with each other. The camera main body 100 can determine a type of the accessory 300 based on an identification signal that is different for each accessory 300.

The camera main body 100 includes the vibration device 107 configured to generate a vibration in order to give a feeling of operation to a user according to an operation on the operation unit 121. The camera main body 100 includes a vibration detector 302 that can acquire vibration data by detecting a vibration of the vibration device 107. As the vibration detector 302, for example, an acceleration sensor or a gyro sensor is used. The vibration generated by the vibration device 107 may be detected by the pitch direction shake detector 127a or the yaw direction shake detector 127b.

The accessory 300 includes an operation unit 303 for a user to perform the operation. The accessory 300 may include a vibration device 304 configured to generate a vibration in order to give the feeling of operation to the user according to an operation on the operation unit 303. The accessory 300 may include a vibration detection unit 309 that can acquire vibration data by detecting a vibration of the vibration device 304. The vibration generated by the vibration device 304 may be detected by a shake detecting unit configured to detect the vibration for correcting a camera shake. The accessory 300 includes a controller 305 configured to control each part of the accessory 300, a memory 307 configured to store various functions and settings of the accessory 300, and a battery 308.

The vibration devices 107 and 304 are controlled based on a specific vibration parameter. The vibration parameter includes, for example, a vibration frequency when the vibration devices 107 and 304 are driven. By vibrating the vibration devices 107 and 304 in the vicinity of a resonance frequency peculiar to a housing such as the camera main body 100, the vibration can be efficiently generated and transmitted to the user as a tactile sensation effect. The vibration parameter includes an amplitude with which the strength of the vibration itself can be adjusted, a duration of the vibration relating to a time when the tactile sensation effect can be perceived and the like.

When a weight of the accessory 300 is not negligible for the camera main body 100 and the vibration parameter is the same, the user feels the tactile sensation effect differently depending on whether or not the accessory 300 is attached. Thus, in this embodiment, when the accessory 300 is attached to the camera main body 100, the vibration devices 107 and 304 are made to vibrate according to a vibration parameter corresponding to the accessory 300. The memory 137 stores in advance a management table 200 including, as a table value, a vibration parameter corresponding to the type of the accessory 300 as illustrated in FIG. 8. When it is detected that the accessory 300 is attached to the camera main body 100, the type of the accessory 300 is determined and the vibration parameter can be changed according to the attached accessory 300 by referring to the management table 200.

A vibration parameter is linked to a corresponding accessory 300 on the management table 200. An accessory combination name category 201 lists, as items, the type of the accessory 300 and a combination of the accessories for when a plurality of accessories 300 are attached. The vibration parameter is stored for each accessory combination name category 201. The management table 200 manages, as examples of the vibration parameter, a vibration frequency 202, a vibration intensity (amplitude) 203 and a vibration duration 204. The management table 200 manages, as the vibration parameters, vibration device built-in information 205 indicating whether or not the vibration device 304 is mounted on the accessory 300, and an attachment location 206 indicating a location where the accessory 300 is attached.

Since the vibration parameter is stored on the management table 200, the vibration devices 107 and 304 can be vibrated by using the vibration parameter corresponding to the type of the accessory 300 when the accessory 300 is attached to the camera main body 100. If the vibration parameter corresponding to the type of the accessory 300 attached to the management table 200 is not stored, it is possible to determine the vibration parameter by performing calibration. The determined vibration parameter may be newly added to the management table 200.

Here, a calibration method will be described. One of the calibration methods makes the vibration device vibrate from a low frequency region to a high frequency region, acquires the vibration data by the vibration detectors 302 and 309, and searches for a resonance frequency so as to reflect a proper vibration frequency as the vibration parameter. The memory 307 may acquire and store in advance the vibration parameters of the vibration devices 107 and 304 before the accessory 300 is attached. Thereby, it is possible to correct the vibration parameters such as the amplitude and vibration duration of the vibration devices 107 and 304 at the frequency determined by the calibration after the accessory 300 is attached.

Figure 9:
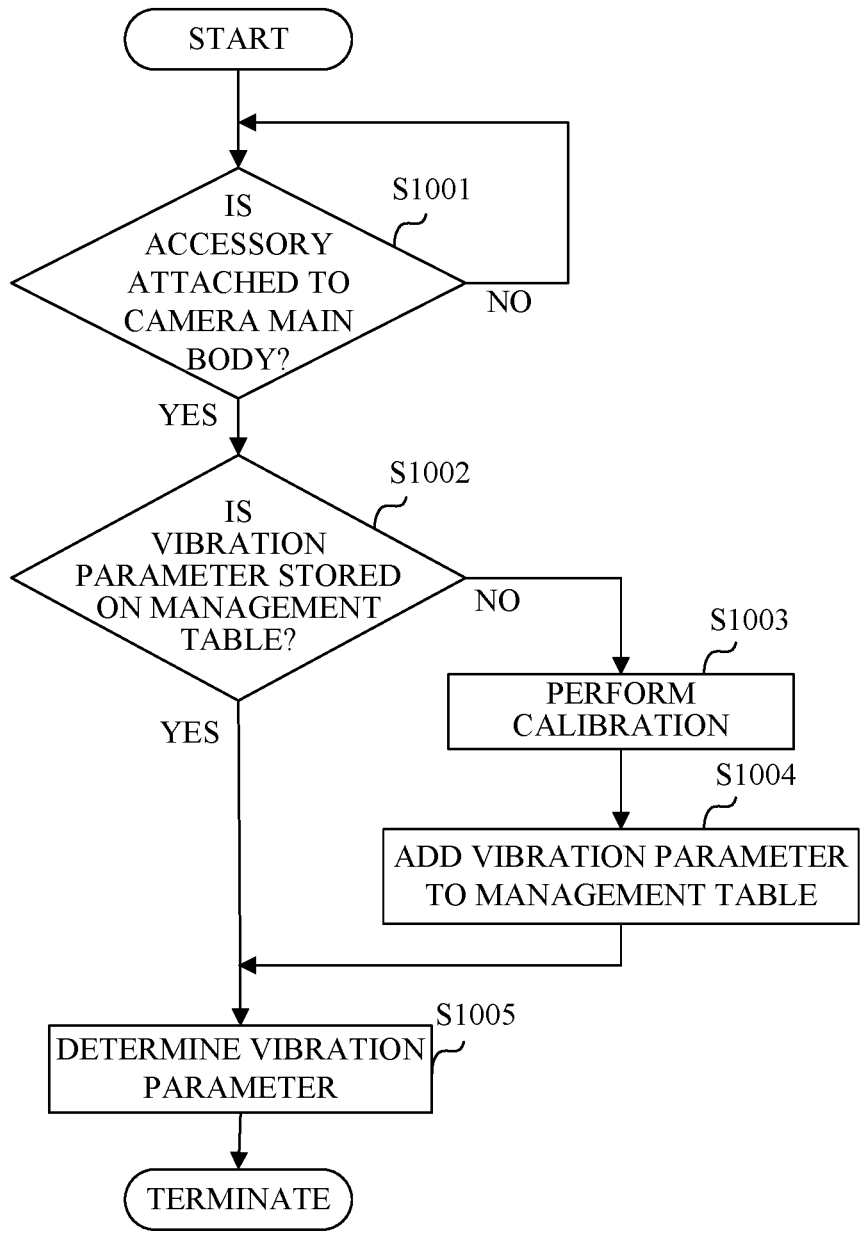
FIG. 9 is a flowchart illustrating a method for controlling a vibration device according to the first embodiment.

Hereinafter, a description will be given of a control method of the vibration device in this embodiment with reference to FIG. 9. FIG. 9 is a flowchart illustrating a method for controlling the vibration device in this embodiment, which is executed by the controller 122.

In the step S1001, the controller 122 determines whether or not the accessory 300 is attached to the camera main body 100, in particular, whether or not the camera main body 100 is electrically connected to the accessory 300 via the connection portions 301 and 306. When the accessory 300 is attached to the camera main body 100, the process proceeds to the step S1002, and when the accessory 300 is not attached to the camera main body 100, the process of the step S1001 is repeated.

In the step S1002, the controller 122 first determines the type of the accessory 300 based on the identification signal received from the accessory 300. Next, the controller 122 determines whether or not the vibration parameter corresponding to the combination of the camera main body 100 and the accessory 300 is stored on the management table 200 in the memories 137 and 307. When the vibration parameter is stored, the process proceeds to the step S1005, and when the vibration parameter is not stored, the process proceeds to the step S1003. If a plurality of accessories 300 are attached to the camera main body 100, it may be determined whether or not the vibration parameter corresponding to the combination of the camera main body 100 and the plurality of accessories 300 is stored on the management table 200.

In the step S1003, the controller 122 determines a vibration parameter acquirable of a tactile sensation effect equivalent to previous tactile sensation by performing the calibration. As a calibration method, as described above, a method may be used of making the vibration devices 107 and 304 vibrate from the low frequency region to the high frequency region. As described above, it is possible to correct the vibration parameter of the vibration devices 107 and 304 after the accessory 300 is attached, based on the previously stored vibration parameter for the vibration devices 107 and 304 before the accessory 300 is attached.

In the step S1004, the controller 122 newly adds the vibration parameter determined in the step S1003 to the management table 200.

In the step S1005, the controller 122 determines the vibration parameter for vibrating the vibration devices 107 and 304 from the vibration parameters stored on the management table 200. Thereby, the vibration devices 107 and 304 vibrate based on the vibration parameter corresponding to the type of the accessory 300 attached to the camera main body 100.

As described above, this embodiment suitably changes the vibration parameter for the vibration devices 107 and 304 according to the presence or absence of the accessory 300, the type of the accessory 300 and the type of the camera main body 100. Thereby, it is possible to reduce the difference in the tactile sensation effect felt by the user even when an attachment state of the accessory 300 changes, and thus the user can perform the operation without feeling uncomfortable.

The vibration devices 107 and 304 may be vibrated selectively or simultaneously for each operation. For example, the vibration device 304 may be vibrated when the accessory 300 is operated, and the vibration device 107 may be vibrated when the camera main body 100 is operated.

When a total weight of the camera main body 100 and the accessory 300 is large and outputs from the vibration devices 107 and 304 are insufficient, the vibration devices 107 and 304 may be synchronized and vibrated at the same time.

This embodiment describes a relationship between the camera main body 100 and the accessory 300 with the camera main body 100 as a main component and the accessory 300 as a subordinate item, but the relationship thereof may be reversed. That is, the memory 137 stores the management table 200 in this embodiment, but the memory 307 may store the management table 200. The memories 137 and 307 may store the management table 200, and when one table has missing information, the vibration parameter may be supplemented by the other table. For example, a case will be described where the memory 137 does not have a vibration parameter corresponding to a specific accessory 300 but the memory 307 stores the vibration parameter and is connected to the camera main body 100. In that case, when the accessory 300 is attached to the camera main body 100, the vibration parameter stored on the memory 307 is transmitted to the camera main body 100 side, and is added, as new information, to the management table 200 stored on the memory 137.

Second Embodiment

In the first embodiment, a description has been given of the method for controlling the vibration device when the camera main body 100 and the accessory 300 are electrically connected. However, if the camera main body 100 and the accessory 300 are not electrically connected, the method of the first embodiment cannot be applied. The accessory 300 not electrically connected to the camera main body 100 is, for example, the tripod seat 112 and a jacket cover. Accessories such as a strobe and an interchangeable lens may not be electrically connected.

In this embodiment, a description will be given of a method for controlling the vibration device when the camera main body 100 and the accessory 300 are not electrically connected and cannot communicate with each other. Specifically, this embodiment performs calibration and corrects a vibration parameter when the power of the camera main body 100 is turned on, making it possible to deal with the accessory 300. As described in the first embodiment, the calibration includes vibrating the vibration device 107 from a low frequency range to a high frequency range and the like. The camera main body 100 may have a function that can execute the calibration by a users operation, but this may be troublesome for the user, and thus the camera main body 100 may have a function of automatically performing the calibration.

Figure 10:
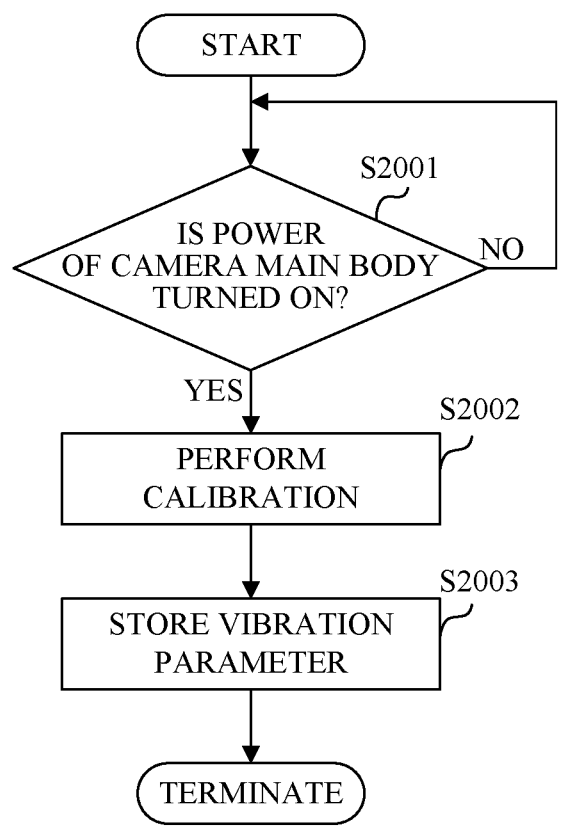
FIG. 10 is a flowchart illustrating a method for controlling a vibration device according to a second embodiment.

Hereinafter, a control method will be described of the vibration device in this embodiment with reference to FIG. 10. FIG. 10 is a flowchart illustrating a method for controlling the vibration device in this embodiment, the method being executed by the controller 122.

In the step S2001, the controller 122 determines whether or not a power of the camera main body 100 is turned on by operating the power button or the like. When the power is turned on, the process proceeds to the step S2002, and when the power is not turned on, the process of the step S2001 is repeated.

In the step S2002, the controller 122 performs the calibration by vibrating the vibration device 107 in order to determine the vibration parameter.

In the step S2003, the controller 122 makes the memory 137 store the vibration parameter determined in the step S2002 as a current setting. In a subsequent operation, if the vibration device is made to vibrate, the vibration parameter stored on the memory 137 can be reflected.

As described above, this embodiment can determine the vibration parameter according to an attachment state of the accessory 300 at the time of turning on the power of the camera main body 100, by performing the calibration at the time of turning on the power of the camera main body 100. Thereby, when the camera main body 100 and the accessory 300 are not electrically connected, even if the attachment state of the accessory 300 changes, it is possible to reduce the difference in the tactile sensation effect felt by the user, and thus the user can perform the operation without feeling uncomfortable.

Third Embodiment

In the second embodiment, a description has been given of the method for controlling the vibration device when the camera main body 100 and the accessory 300 are not electrically connected. However, if the accessory 300 not electrically connected to the camera main body 100 is attached to the camera main body 100 after the calibration is executed at the time of turning on the camera main body 100, a difference may occur in a user's feeling of a tactile sensation effect generated by a vibration of a vibration device. In that case, it is necessary to properly correct the vibration parameter.

In this embodiment, the memory 137 stores in advance vibration data detected by the vibration detector 302 when the vibration device 107 vibrates. Hence, the controller 122 can correct the vibration parameter based on a difference between the vibration data acquired from the vibration detector 302 when the vibration device 107 vibrates and the vibration data stored on the memory 137 in advance. For example, when a frequency of the vibration data acquired this time is different from a frequency of the vibration data acquired last time, the controller 122 may correct the vibration frequency among the vibration parameters. When a vibration of the vibration data acquired this time is weaker or stronger than a vibration of the vibration data acquired last time, the controller 122 may correct a vibration strength among the vibration parameter according to a current vibration strength. When a damping time of the vibration data acquired this time is shorter or longer than a damping time of the vibration data acquired last time, the controller 122 may correct a vibration duration among the vibration parameter according to a current length of the damping time. When a difference between the vibration data acquired last time and the vibration data acquired this time is minute, specifically, when the difference is less than a predetermined value, the vibration parameter may not be corrected.

Figure 11:
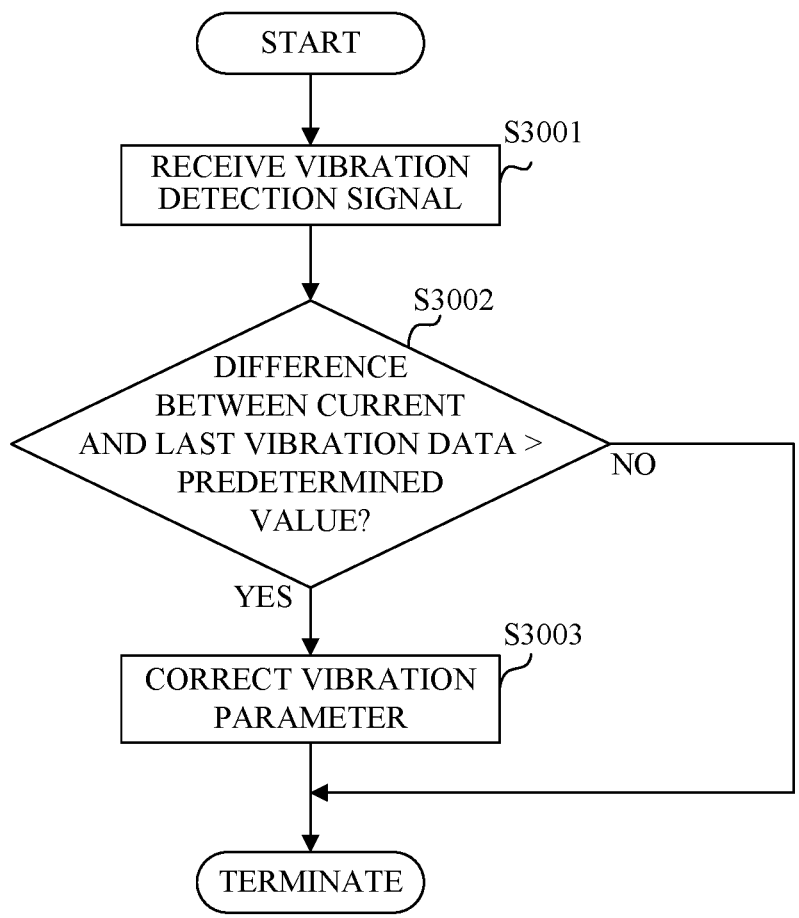
FIG. 11 is a flowchart illustrating a method for controlling a vibration device according to a third embodiment.

Hereinafter, a description will be given of the control method of the vibration device in this embodiment with reference to FIG. 11. FIG. 11 is a flowchart illustrating a method for controlling the vibration device in this embodiment, which is executed by the controller 122.

In the step S3001, the controller 122 determines whether or not the vibration detector 302 detects the vibration of the vibration device 107. Specifically, the controller 122 determines whether or not a vibration detection signal is received from the vibration detector 302. When the vibration of the vibration device 107 is detected, the process proceeds to the step S3002, and when the vibration of the vibration device 107 is not detected, the process of the step S3001 is repeated.

In the step S3002, the controller 122 determines whether or not the difference is more than the predetermined value between the vibration data acquired last time and the vibration data acquired this time. When the difference is more than the predetermined value, the process proceeds to the step S3003, and when the difference is less than the predetermined value, this flow is terminated.

In the step S3003, the controller 122 corrects the vibration parameter based on the difference between the last vibration data and the current vibration data.

By performing the above operation, it is possible to properly correct the vibration parameter of the vibration device 107.

The vibration parameter may be corrected based not only on the vibration generated by the operation but also on a difference in vibration data acquired by periodically vibrating the vibration device 107.

As described above, this embodiment can properly correct the vibration parameter of the vibration device 107, even when the accessory 300 not electrically connected to the camera main body 100 is attached after the power of the camera main body 100 is turned on. Thereby, it is possible to reduce the difference in the tactile sensation effect felt by the user when an attachment state of the accessory 300 changes, and thus the user can perform the operation without feeling uncomfortable.

The method described in this embodiment can be used in combination with the method described in the first embodiment as well as the method described in the second embodiment.

Fourth Embodiment

The first to third embodiments do not particularly describe a control relating to an image stabilization against an image blur caused by a vibration of the image pickup unit 133 when the vibration device 107 inside the grip portion 101 vibrates or when the vibration device 108 inside the lens barrel 102 vibrates. This embodiment will give a description of a control for reducing an image blur caused by a vibration of a vibration device.

Figure 12:
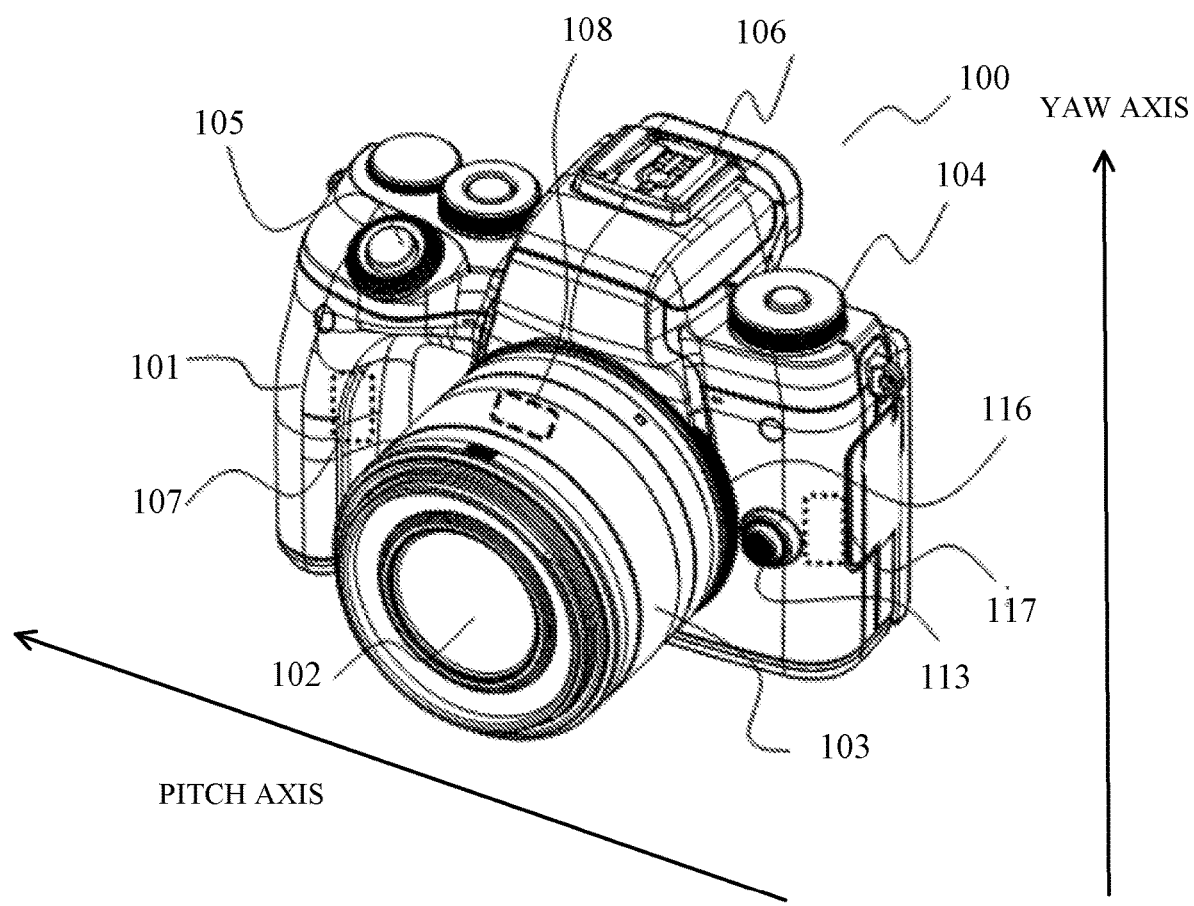
FIG. 12 is an external perspective view of a digital camera as an example of an electronic apparatus according to each embodiment of the present invention.

FIG. 12 is an external perspective view of the digital camera 1 viewed from diagonally above a front side. In comparison with the exterior perspective view illustrated in FIG. 1, a second vibration device 117 is added on an opposite side to the vibration device 107 inside the grip portion 101. It is assumed that a direction from the bottom to the top of the camera main body 100 is a yaw direction of the yaw direction shake detector 127b, and that a direction from the second vibration device 117 to the vibration device 107 is a pitch axis direction of the pitch direction shake detector 127a. The components other than these are the same as those in FIG. 1, and thus a description thereof will be omitted.

Figure 13A:
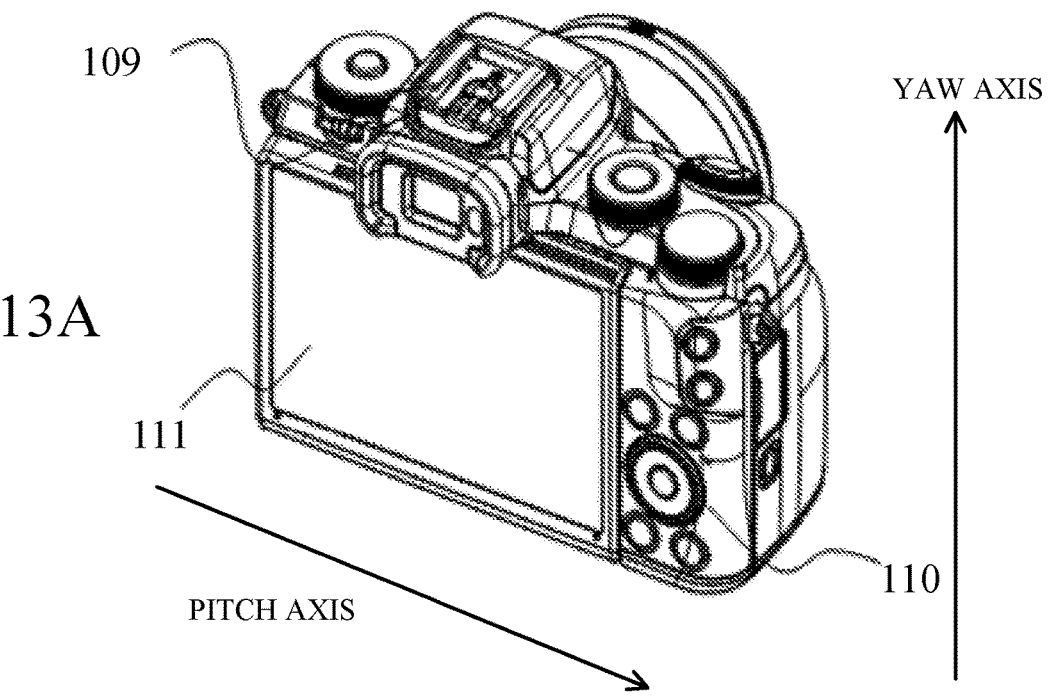
FIGS. 13A and 13B are a rear perspective view and a bottom view of a digital camera.
Figure 13B:
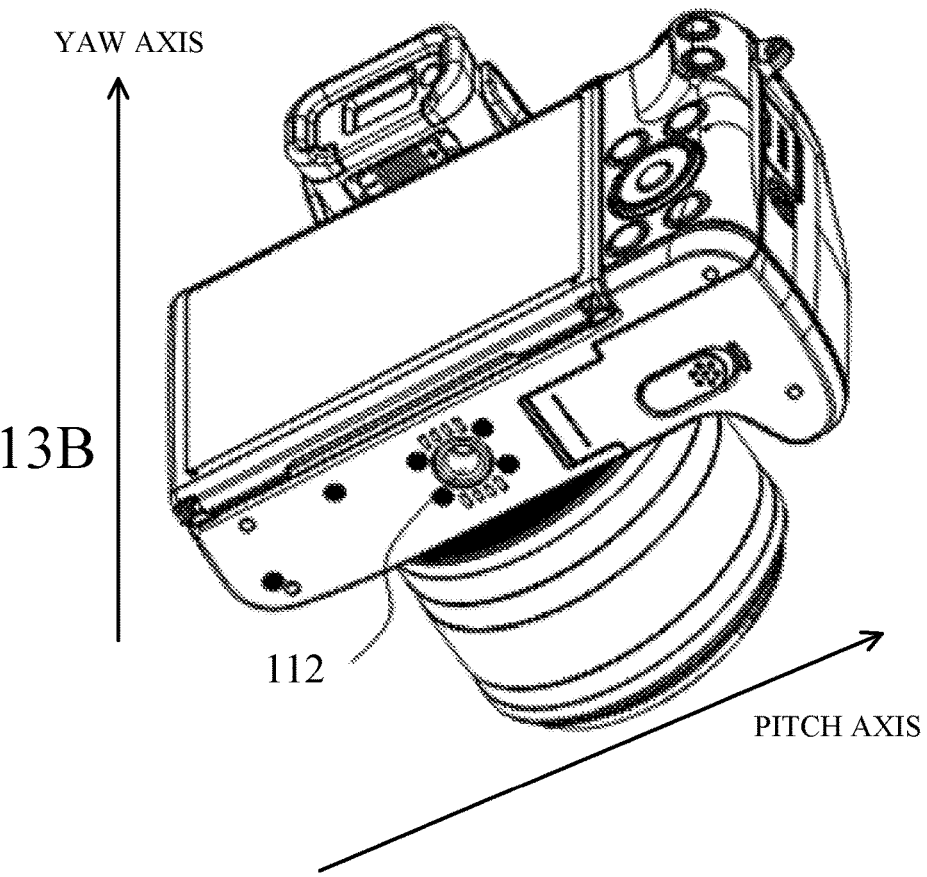
Figure 14:
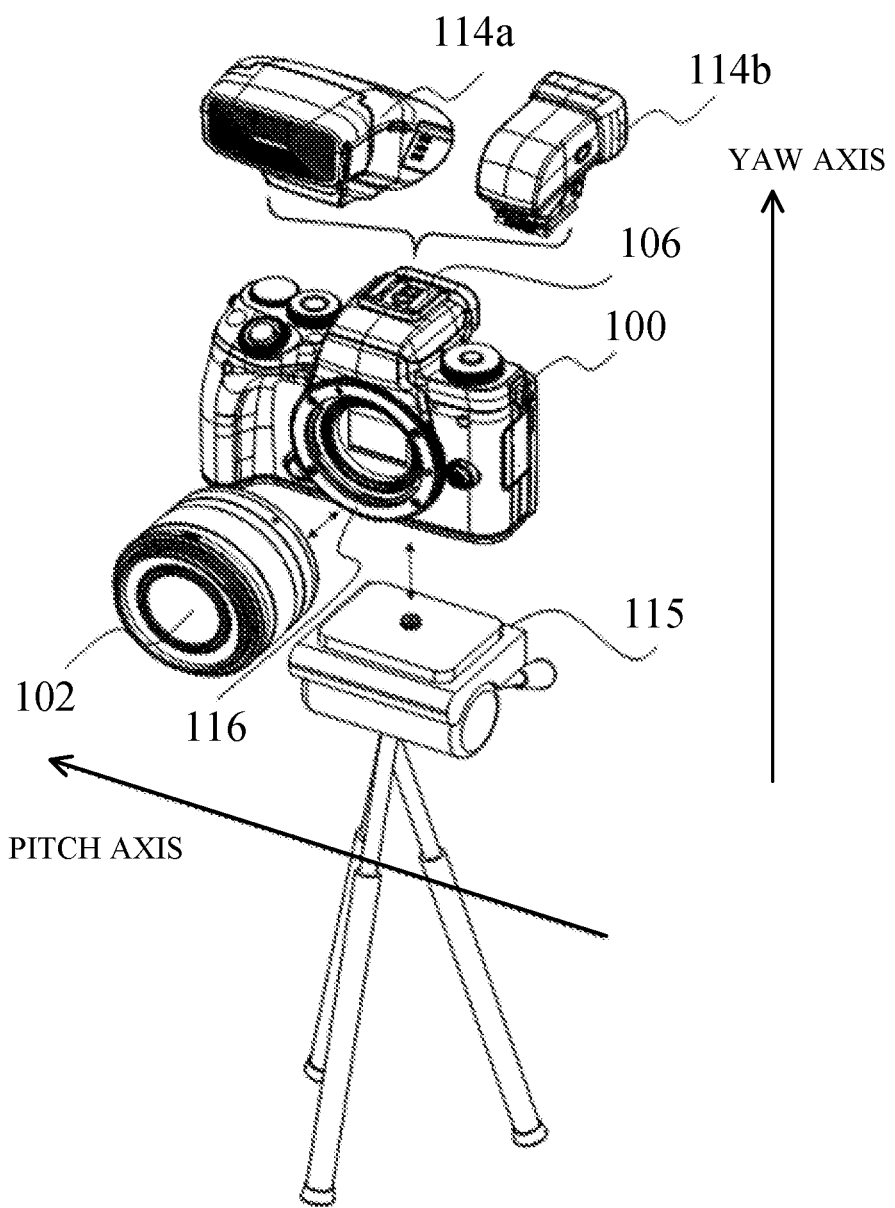
FIG. 14 is a diagram illustrating various attachments attachable to a digital camera main body.

FIG. 13A is a rear perspective view of the camera main body 100, FIG. 13B is a bottom view of the camera main body 100, and FIG. 14 is a diagram illustrating various attachments attachable to the camera main body 100. The components are the same as those in FIGS. 3, 4 and 5, respectively, and thus the description thereof will be omitted. Similarly to FIG. 12, the pitch axis direction and the yaw axis direction are additionally illustrated in FIGS. 13A, 13B and 14.

Figure 15:
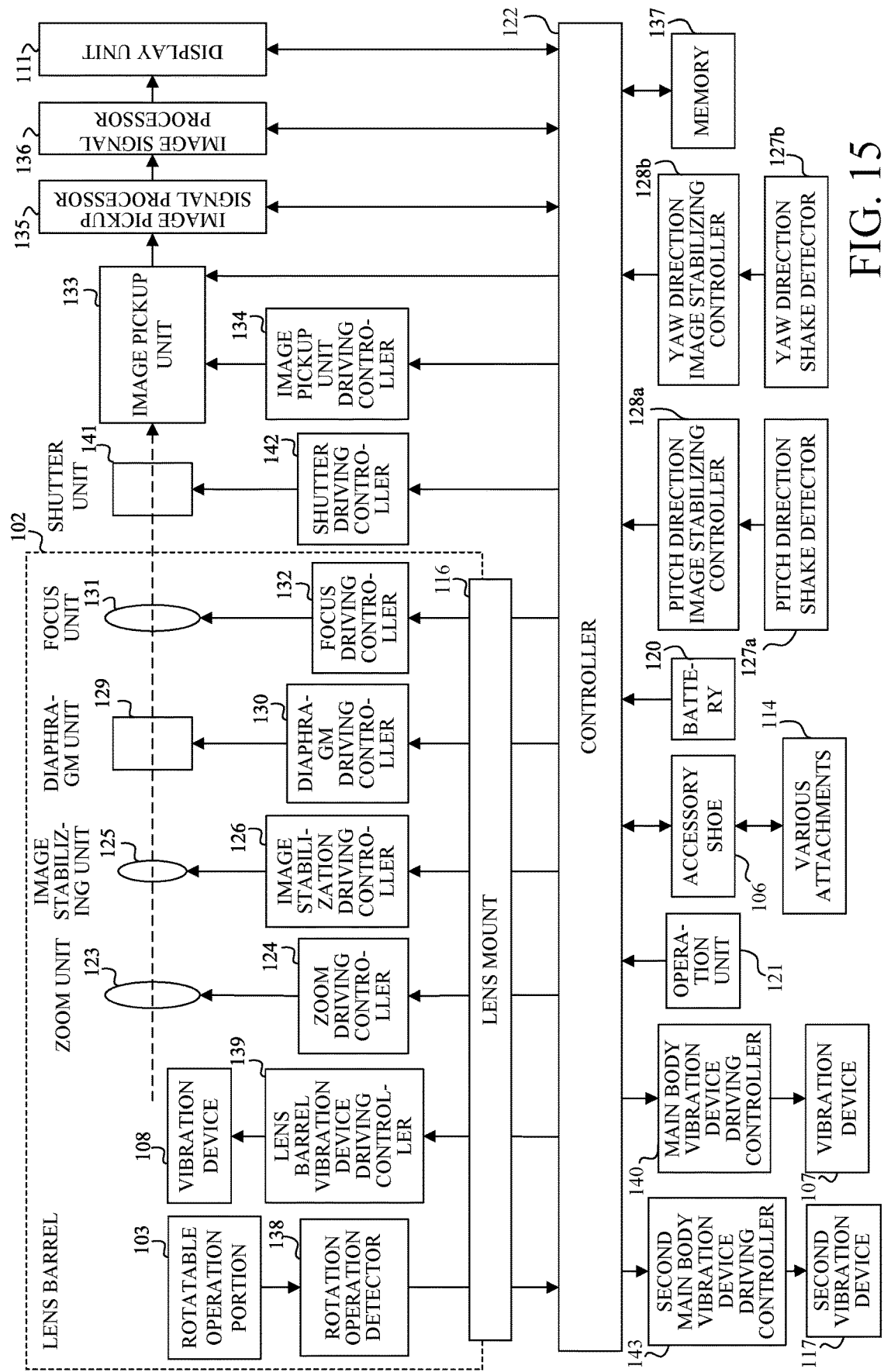
FIG. 15 is a block diagram of the digital camera.

FIG. 15 is a block diagram of a digital camera in this embodiment. The second vibration device 117 configured to vibrate the digital camera main body 100 and a second main body vibration device driving controller 143 configured to perform a vibration control on the second vibration device 117 are added to the block diagram of FIG. 6. The components other than these are the same as those in FIG. 6, and thus the description thereof will be omitted.

Next, a description will be given of the control for reducing the image blur caused by the vibration of the vibration device with reference to FIGS. 16 to 19.

Figure 16:
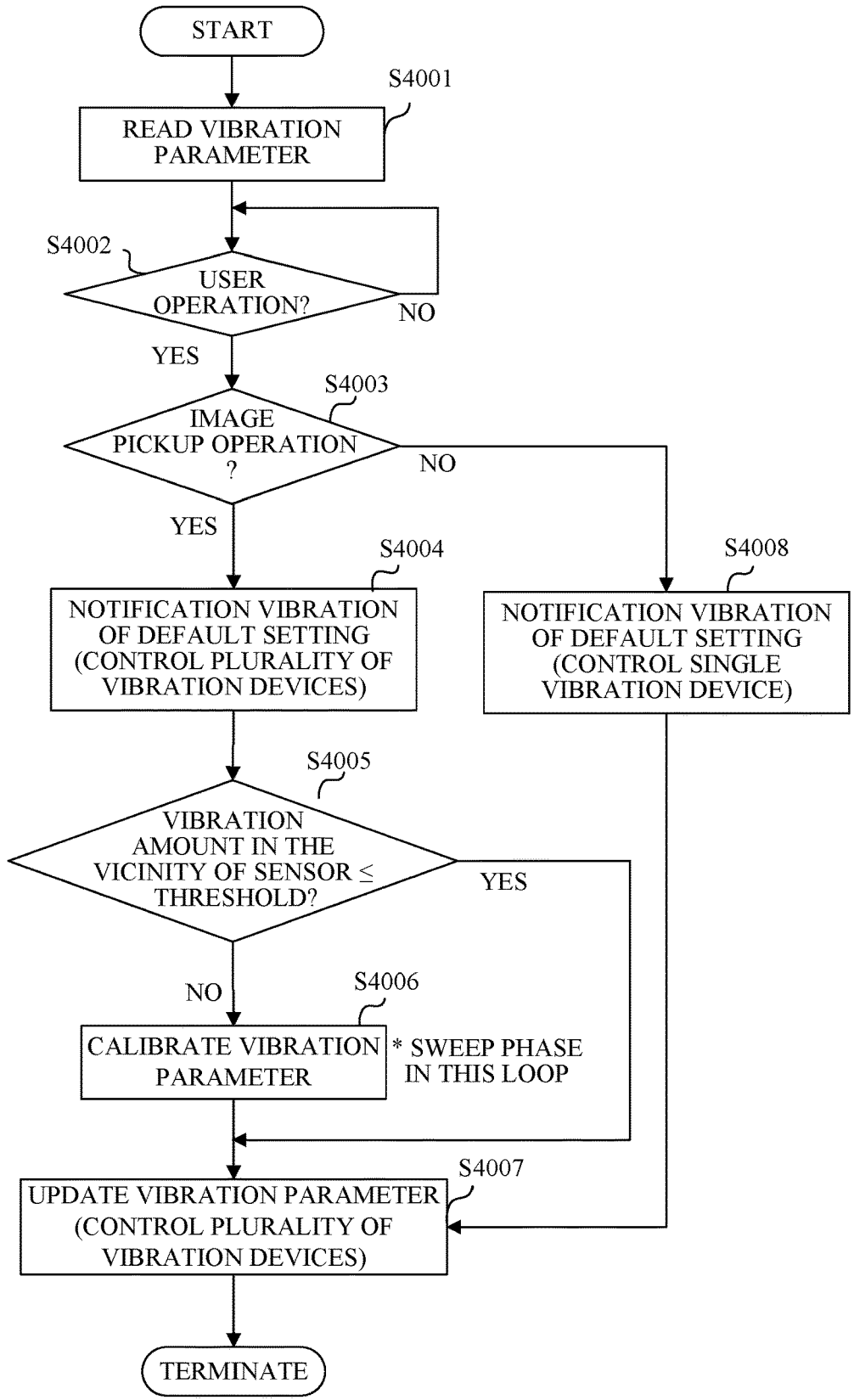
FIG. 16 is a flowchart illustrating a method for controlling a vibration device according to a fourth embodiment.
Figure 18A:
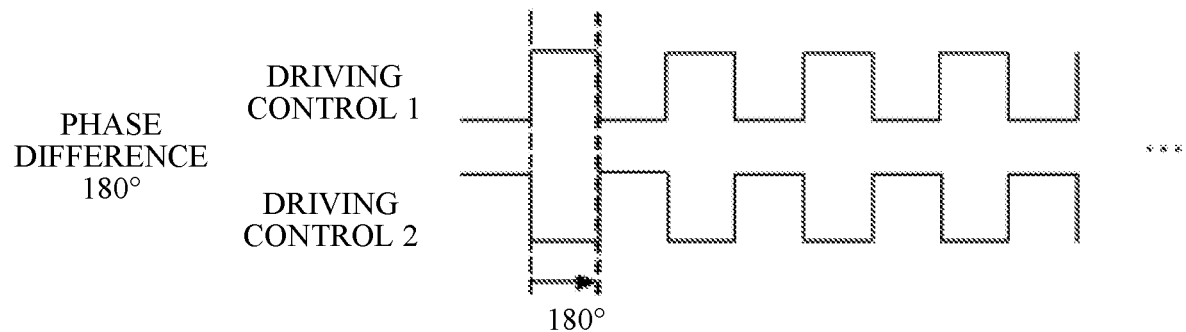
FIGS. 18A and 18B are diagrams illustrating vibration control according to the fourth embodiment.
Figure 18B:
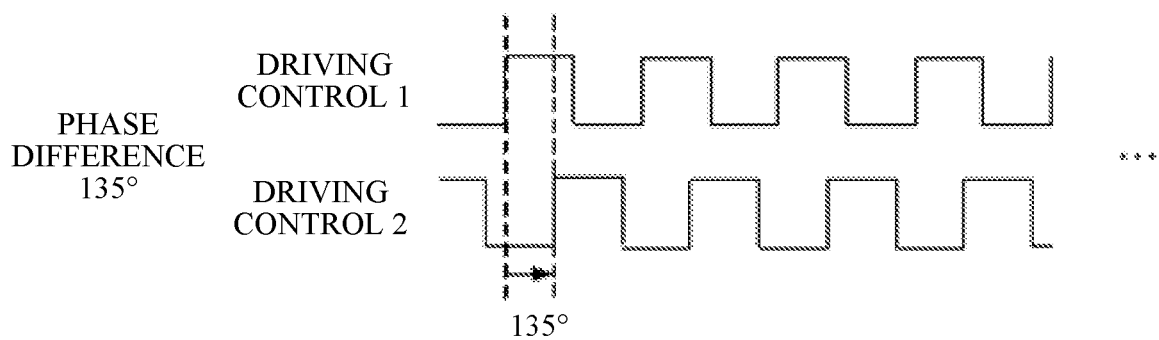

FIG. 16 is a flowchart of this embodiment. FIG. 17 is a management table of vibration parameters in this embodiment. FIGS. 18A and 18B are diagrams illustrating a control example of the vibration device in this embodiment. FIGS. 19A to 19D are diagrams illustrating an image blur reduction effect of a vibration device control in this embodiment.

In the step S4001 of FIG. 16, the controller 122 reads the vibration parameter stored on the memory 137 at a start of an operation such as turning on the power of the camera main body 100. The lens barrel vibration device driving controller 139, the main body vibration device driving controller 140 and the second main body vibration device driving controller 143 set the read vibration parameter. This embodiment will describe, as an example, a control of two vibration devices, that is, the vibration device 107 and the second vibration device 117.

In the step S4002, when the user operates the camera main body 100 using the operation unit 121, the process proceeds to the step S4003, and when the user does not perform the operation, the process returns to the step S4002.

In the step S4003, the controller 122 determines whether or not a user's operation is an image pickup operation. When the user's operation is the image pickup operation, the process proceeds to the step S4004. When the user's operation is not the image pickup operation, the process proceeds to the step S4008. The image pickup operation here refers to an operation that includes image recording such as still image pickup or motion image recording. When the image pickup operation is performed, in the steps S4004 to S4007, a control is performed for reducing the image blur of the image pickup unit 133 caused by the vibration of the vibration device. The control for reducing the image blur in this embodiment is a control for canceling the vibration in the vicinity of the image pickup unit 133 by using a plurality of vibration devices.

In the step S4004, the main body vibration device driving controller 140 makes the vibration device 107 vibrate and the second main body vibration device driving controller 143 makes the second vibration device 117 vibrate each using the vibration parameter read in the step S4001.

In the step S4005, the controller 122 determines whether or not the vibration amount in the vicinity of the image pickup unit 133 is less than a predetermined threshold based on angular velocity data of the pitch direction shake detector 127a read from the pitch direction image stabilizing controller 128a and angular velocity data of the yaw direction shake detector 127b read from the yaw direction image stabilizing controller 128b. Here, in this embodiment, it is assumed that the pitch direction shake detector 127a and the yaw direction shake detector 127b are disposed in the vicinity of the image pickup unit 133 near the lens barrel 102, and that it is possible to measure the vibration amount as the angular velocity data in the vicinity of the image pickup unit 133.

In the step S4005, when it is determined that the vibration amount of the image pickup unit 133 is not less than or equal to a predetermined threshold $|\omega|$ but the vibration amount is more than the predetermined threshold $|\omega|$, a calibration is performed of the vibration parameter. Here, a description will be given of a calibration method of the vibration parameter with reference to FIGS. 17 and 19A to 19D.

Figure 19A:
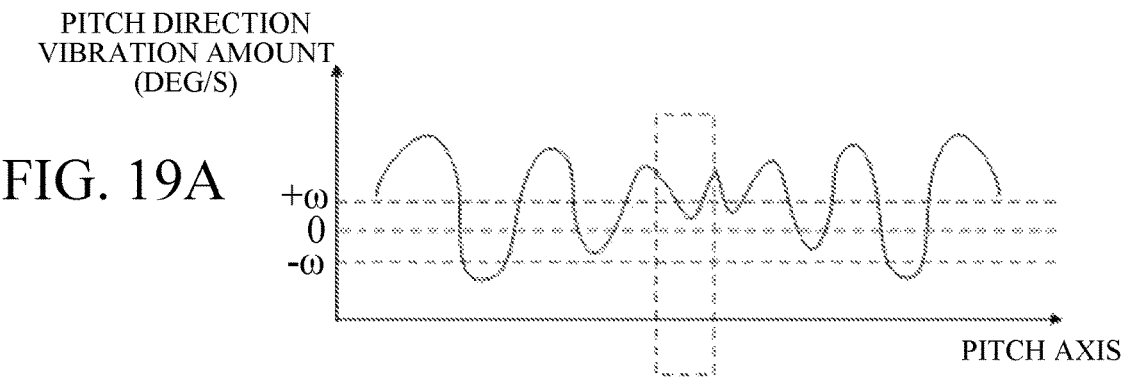
FIGS. 19A to 19D are diagrams illustrating vibration of a digital camera according to the fourth embodiment.
Figure 19B:
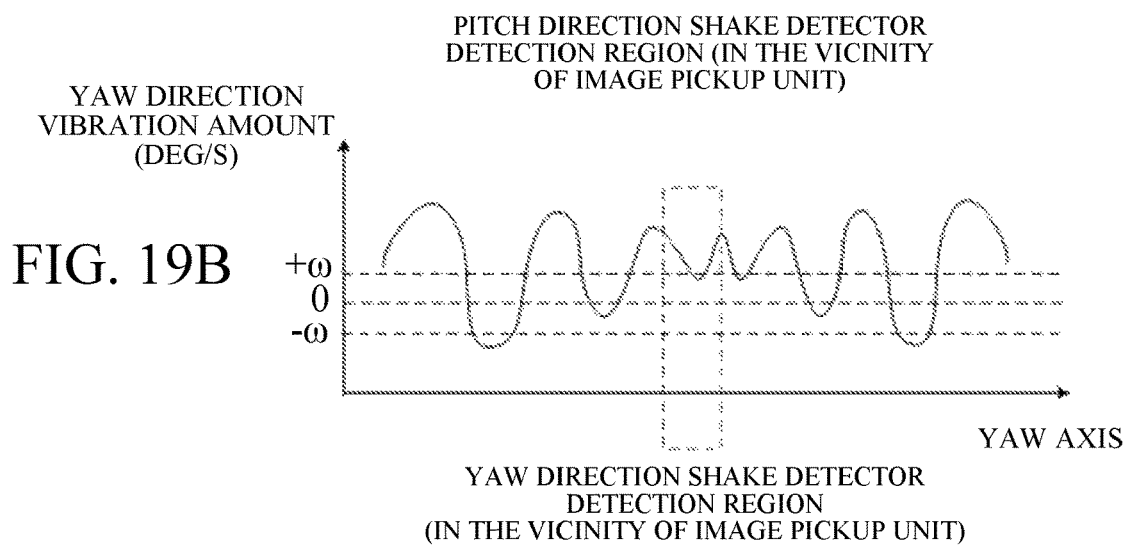

FIG. 19A illustrates the angular velocity data of the pitch direction shake detector 127a when it is determined in the step S4005 that the vibration amount of the image pickup unit 133 is more than the predetermined threshold $|\omega|$. FIG. 19B illustrates the angular velocity data of the yaw direction shake detector 127b when it is determined in the step S4005 that the vibration amount of the image pickup unit 133 is more than the predetermined threshold $|\omega|$.

A horizontal axis in FIG. 19A matches the pitch axis in FIGS. 12 to 14, and represents coordinates in which a vicinity of an origin is a lens lock release button 113 side of the camera main body 100 and the grip portion 101 approaches as the distance from the origin increases.

On the other hand, a horizontal axis in FIG. 19B matches the yaw axes in FIGS. 12 to 14, and represents coordinates in which a vicinity of an origin is on a bottom side of the camera main body 100, and the top surface of the camera main body 100 approaches as the distance from the origin increases.

A vertical axis in FIG. 19A represents the vibration amount (angular velocity data) in the pitch direction and the threshold is $\pm \omega (=|\omega|)$. A region surrounded by a broken line in FIG. 19A indicates the vibration amount in the vicinity of the image pickup unit 133 acquired by the pitch direction shake detector 127a.

On the other hand, a vertical axis in FIG. 19B represents the vibration amount (angular velocity data) in the yaw direction and the threshold is $\pm \omega (=|\omega|)$. A region surrounded by a broken line in FIG. 19B indicates the vibration amount in the vicinity of the image pickup unit 133 acquired by the yaw direction shake detector 127b.

Next, a description will be given of a driving control of the main body vibration device driving controller 140 and the second main body vibration device driving controller 143 in the step S4004. In a vibration parameter management table given in FIG. 17, for example, a default setting is 180 for a phase difference 207 of a vibration of a vibration parameter A when the strobe 1 is attached. This indicates that, as illustrated in FIG. 18A, a phase difference of the driving control signal is 180°, and that when a driving control 1 is set for the control signal of the main body vibration device driving controller 140 and a driving control 2 is set for the second main body vibration device driving controller 143, each control signal shifts by a half cycle. At this time, as illustrated in FIG. 19A, it is indicated that, in the camera main body 100, a portion near the grip portion 101 and a portion on an opposite side of the grip portion 101 have a large vibration amount in the pitch direction of the camera main body 100, and a portion far from those has a relatively small vibration amount that is more than the threshold. FIG. 19B indicates that, in the camera main body 100, a portion near the bottom surface and a portion near the top surface have a large vibration amount in the yaw direction of the camera main body 100, and a portion far from those has relatively small vibration amount that is more than the threshold.

This embodiment disposes a plurality of vibration devices such as the vibration device 107 and the second vibration device 117 at a position relatively far from the image pickup unit 133, and devises the driving control of these vibration devices. Thereby, this embodiment can perform the driving control for reducing the image blur by weakening the vibration of the image pickup unit disposed far from the vibration device while, in the vicinity of the vibration device, generating the vibration of an amount necessary to notify the user of the vibration (perform a user notification).

Figure 19C:
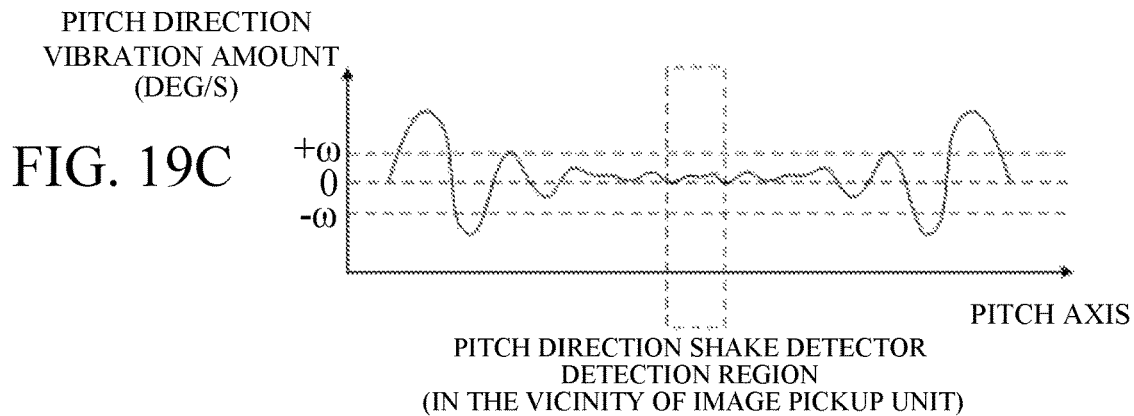
Figure 19D:
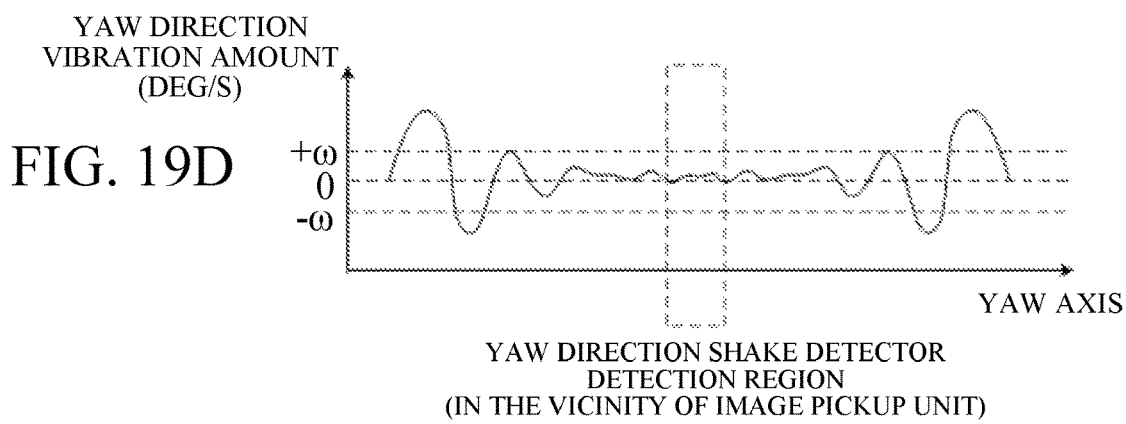

When it is determined in the step S4005 that the vibration amount of the image pickup unit 133 is not less than or equal to the predetermined threshold |ω| but the vibration amount is more than the predetermined threshold |ω|, the vibration parameter is calibrated in the step S4006. Specifically, a phase is swept of the driving control 2 of the second main body vibration device driving controller 143 with respect to the driving control 1 of the main body vibration device driving controller 140, and a phase difference is searched for in which the vibration amount of the pitch direction shake detector 127a and the yaw direction shake detector 127b is less than or equal to the predetermined threshold. By calibrating the phase difference to an optimum phase difference, the vibration amount of the pitch direction shake detector 127a and the yaw direction shake detector 127b, each of which is in the vicinity of the image pickup unit 133, is made to equal to or less than the predetermined threshold |ω| as illustrated in FIGS. 19C and 19D. Thereby the vibration amount of the image pickup unit 133 decreases.

According to a result of the calibration, when a phase difference 135° of the driving control signal is determined to be the optimum value as illustrated in FIG. 18B, the vibration parameter A in FIG. 17 is updated to the calibration result 135° in the step S4007.

On the other hand, when the vibration amount of the image pickup unit 133 is determined in the step S4005 to be less than or equal to the predetermined threshold |ω|, it is regarded that the vibration in the vicinity of the image pickup unit 133 is reduced, and thus the calibration is not performed on the vibration parameter and the flow is terminated.

When it is determined in the step S4003 that the operation is not the image pickup operation, it is not necessary to reduce the image blur of the image pickup unit 133. Thus, in the step S4008, as described in the first to third embodiments, the user notification is performed by a single vibration device, and the flow is terminated.

In this embodiment, the strobe 1 is described as an example of the accessory, but the above-described calibration may be similarly performed on accessories subsequent to the vibration parameter B illustrated in FIG. 17.

As described above, the driving control is performed for reducing the image blur caused by the vibration of the image pickup unit. The vibration amount is reduced of the pickup unit far from the vibration unit while the vibration is generated of the amount necessary for performing the user notification in the vicinity of the vibration device. Thus, it is possible to achieve both the user notification and the reduction of the image blur when the vibration device performs the user notification.

Other Embodiments

Embodiment(s) of the present invention can also be realized by a computer of a system or apparatus that reads out and executes computer executable instructions (e.g., one or more programs) recorded on a storage medium (which may also be referred to more fully as a 'non-transitory computer-readable storage medium') to perform the functions of one or more of the above-described embodiment(s) and/or that includes one or more circuits (e.g., application specific integrated circuit (ASIC)) for performing the functions of one or more of the above-described embodiment(s), and by a method performed by the computer of the system or apparatus by, for example, reading out and executing the computer executable instructions from the storage medium to perform the functions of one or more of the above-described embodiment(s) and/or controlling the one or more circuits to perform the functions of one or more of the above-described embodiment(s). The computer may comprise one or more processors (e.g., central processing unit (CPU), micro processing unit (MPU)) and may include a network of separate computers or separate processors to read out and execute the computer executable instructions. The computer executable instructions may be provided to the computer, for example, from a network or the storage medium. The storage medium may include, for example, one or more of a hard disk, a random-access memory (RAM), a read only memory (ROM), a storage of distributed computing systems, an optical disk (such as a compact disc (CD), digital versatile disc (DVD), or Blu-ray Disc (BD)™), a flash memory device, a memory card, and the like.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

What is claimed is:

1. A camera body to which an external apparatus which is at least one of a lens unit, a strobe unit, a microphone, a viewfinder unit, a tripod, and a jacket is detachably attachable, the camera body comprising:
   a vibration device provided on at least one of the camera body and the external apparatus;
   a detecting unit configured to output a detection signal indicating that the external apparatus is attached to the camera body;
   a vibration detecting unit configured to detect a vibration of the vibration device; and
   at least one processor or circuit which functions as a controlling unit configured to make the vibration device vibrate by using a vibration parameter corresponding to a type of the external apparatus to be attached to the camera body,
      wherein when the detection signal is acquired, the controlling unit makes the vibration device vibrate by using a vibration parameter corresponding to the type of the external apparatus to be attached to the camera body, the vibration parameter being acquired from management data relating to a vibration parameter of the vibration device,
      wherein when the management data does not store the vibration parameter corresponding to the type of the external apparatus to be attached to the camera body, the controlling unit makes the vibration device vibrate by using a vibration parameter corresponding to the type of the external apparatus to be attached to the camera body, the vibration parameter being acquired by performing calibration that causes the vibration device to generate a vibration, and
      wherein in the calibration, the controlling unit causes the vibration device to vibrate at a plurality of frequencies and acquires the vibration parameter corresponding to the type of the external apparatus to be attached to the camera body based on a detection result that the vibration detecting unit acquires when the vibration device is caused to vibrate at each of the plurality of frequencies.

2. The camera body according to claim 1, further comprising a memory unit configured to store the management data,
   wherein the controlling unit makes the vibration device vibrate by using a vibration parameter corresponding to the type of the external apparatus to be attached to the camera body, the vibration parameter being acquired from the management data.

3. The camera body according to claim 1,
wherein the controlling unit makes the vibration device vibrate by using the vibration parameter corresponding to the type of the external apparatus to be attached to the camera body, the vibration parameter being acquired from the management data that is stored on the external apparatus to be attached to the camera body.

4. The camera body according to claim 1,
wherein when a power of the camera body is turned on, the controlling unit makes the vibration device vibrate by using a vibration parameter corresponding to the type of the external apparatus to be attached to the camera body, the vibration parameter being acquired by performing the calibration that causes the vibration device to generate a vibration.

5. The camera body according to claim 1, further comprising a memory unit configured to store a detection result of the vibration detecting unit,
wherein when a difference is more than a predetermined value between a detection result of the vibration detecting unit for a last vibration of the vibration device and a detection result of the vibration detecting unit for a current vibration of the vibration device, the controlling unit corrects the vibration parameter corresponding to the type of the external apparatus to be attached to the camera body based on the difference.

6. The camera body according to claim 5,
wherein the controlling unit periodically makes the vibration device vibrate.

7. The camera body according to claim 1,
wherein the vibration detecting unit is capable of detecting a shake of the camera body.

8. The camera body according to claim 1,
wherein the vibration device is included in the external apparatus.

9. The camera body according to claim 1,
wherein the vibration device is included in the camera body.

10. The camera body according to claim 1,
wherein the vibration parameter includes at least one of a vibration frequency, amplitude, and duration.

11. An electronic apparatus to which an external apparatus is detachably attachable comprising:
a vibration detecting unit configured to detect vibrations of a plurality of vibration devices provided on at least one of the electronic apparatus and the external apparatus; and
at least one processor or circuit which functions as a controlling unit configured to make the plurality of vibration devices vibrate by using a vibration parameter corresponding to a type of the external apparatus to be attached to the electronic apparatus, and
wherein the controlling unit controls calibration on vibration parameters for the plurality of vibration devices in order that a vibration amount of the vibration detecting unit is equal to or less than a predetermined threshold.

12. The electronic apparatus according to claim 11,
wherein the controlling unit controls the calibration by controlling a phase difference of driving signals of the plurality of vibration devices.

13. An optical apparatus comprising:
an optical element; and
an electronic apparatus according to claim 11.

14. An image pickup apparatus comprising:
an image sensor configured to convert an optical image of an object into an electrical signal by a photoelectric conversion; and
an electronic apparatus according to claim 11.

15. A control method of a camera body to which an external apparatus which is at least one of a lens unit, a strobe unit, a microphone, a viewfinder unit, a tripod, and a jacket is detachably attachable, the camera body including a vibration device provided on at least one of the camera body and the external apparatus and a vibration detecting unit configured to detect a vibration of the vibration device, the control method comprising steps of:
acquiring a detection signal indicating that the external apparatus is attached to the camera body;
acquiring a vibration parameter corresponding to a type of the external apparatus to be attached to the camera body; and
making the vibration device vibrate by using the vibration parameter,
wherein when the detection signal is acquired, a vibration parameter corresponding to the type of the external apparatus to be attached to the camera body is acquired from management data relating to a vibration parameter of the vibration device, and the vibration device is made to vibrate,
wherein when the management data does not store the vibration parameter corresponding to the type of the external apparatus to be attached to the camera body, a vibration parameter corresponding to the type of the external apparatus to be attached to the camera body is acquired by calibration that causes the vibration device to generate a vibration, and the vibration device is made to vibrate, and
wherein in the calibration, the vibration device is caused to vibrate at a plurality of frequencies, and the vibration parameter corresponding to the type of the external apparatus to be attached to the camera body is acquired based on a detection result that the vibration detecting unit acquires when the vibration device is caused to vibrate at each of the plurality of frequencies.

16. A non-transitory computer-readable storage medium storing a computer program that causes a computer to execute the control method according to claim 15.

17. A control method of an electronic apparatus to which an external apparatus is detachably attachable, the electronic apparatus including a vibration detecting unit configured to detect vibrations of a plurality of vibration devices provided on at least one of the electronic apparatus and the external apparatus, the control method comprising steps of:
acquiring a vibration parameter corresponding to a type of the external apparatus to be attached to the electronic apparatus;
making the plurality of vibration devices vibrate by using the vibration parameter; and
controlling calibration on vibration parameters for the plurality of vibration devices in order that a vibration amount of the vibration detecting unit is equal to or less than a predetermined threshold.

* * * * *